US012650737B1

(12) United States Patent
de Goumoëns et al.

(10) Patent No.: US 12,650,737 B1
(45) Date of Patent: Jun. 9, 2026

(54) ANALOG COMPUTER PERIPHERAL DEVICE WITH HAPTIC FEEDBACK

(71) Applicant: Logitech Europe S.A., Lausanne (CH)

(72) Inventors: Frédéric Alexis Guillaume de Goumoëns, Morges (CH); Léo Victor Pedro Zeender, Lausanne (CH); Cyril Yves Anthony Drezet, Les Rousses (FR); Virgile Hernicot, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 19/197,877

(22) Filed: May 2, 2025

(51) Int. Cl.
　　*G06F 3/0354*　　(2013.01)
　　*G06F 3/01*　　(2006.01)

(52) U.S. Cl.
　　CPC .......... *G06F 3/03543* (2013.01); *G06F 3/016* (2013.01)

(58) Field of Classification Search
　　CPC .......................... G06F 3/03543; G06F 3/016
　　See application file for complete search history.

(56) References Cited

U.S. PATENT DOCUMENTS

| | | | | | |
|---|---|---|---|---|---|
| 6,050,718 | A | * | 4/2000 | Schena | A63F 13/23 345/161 |
| 6,243,078 | B1 | | 6/2001 | Rosenberg | |
| 7,821,494 | B2 | | 10/2010 | Tsai et al. | |
| 7,965,276 | B1 | | 6/2011 | Martin et al. | |
| 8,120,584 | B2 | | 2/2012 | Grivna et al. | |
| 8,665,217 | B2 | | 3/2014 | Farag et al. | |
| 9,678,577 | B1 | | 6/2017 | Rutledge et al. | |

| | | | | | |
|---|---|---|---|---|---|
| 10,466,803 | B1 | | 11/2019 | Rutledge et al. | |
| 10,528,074 | B1 | * | 1/2020 | Olsson | G06F 3/0338 |
| 10,642,435 | B2 | | 5/2020 | Maru et al. | |
| 10,732,731 | B2 | | 8/2020 | Odgers et al. | |
| 10,845,878 | B1 | * | 11/2020 | Zhao | G06F 3/0202 |
| 10,935,620 | B2 | | 3/2021 | Das et al. | |
| 10,942,610 | B2 | | 3/2021 | Maru et al. | |
| 10,948,313 | B2 | | 3/2021 | Kost et al. | |
| 11,048,344 | B1 | * | 6/2021 | Drezet | H01F 7/20 |
| 11,079,874 | B2 | | 8/2021 | Lapointe et al. | |
| 11,092,657 | B2 | | 8/2021 | Maru et al. | |
| 11,093,060 | B2 | | 8/2021 | Yancey et al. | |
| 11,204,670 | B2 | | 12/2021 | Maru et al. | |
| 11,294,469 | B2 | * | 4/2022 | Gajiwala | G06F 1/1662 |

(Continued)

FOREIGN PATENT DOCUMENTS

WO　　　2020033468 A1　　2/2020

OTHER PUBLICATIONS

U.S. Appl. No. 19/224,566, "Non-Final Office Action", filed Feb. 2, 2026, 19 pages.

(Continued)

*Primary Examiner* — Vinh T Lam
(74) *Attorney, Agent, or Firm* — Kilpatrick Townsend & Stockton LLP

(57) ABSTRACT

A switchless computer mouse comprising: a keyplate operable to be depressed over a range of motion; a conductive element coupled to the keyplate; a sensor configured separate from the conductive element; a haptic element; and one or more processors operable to: control the sensor to detect a position of the conductive element over the keyplate range of motion; and control the haptic element to generate a haptic feedback when the sensor detects that the position of the conductive element corresponds to a preset threshold position within the range of motion.

10 Claims, 17 Drawing Sheets

(56) References Cited

U.S. PATENT DOCUMENTS

| | | | |
|---|---|---|---|
| 11,301,054 B1* | 4/2022 | Drezet ...................... H01F 7/20 |
| 11,402,946 B2 | 8/2022 | Duewer et al. |
| 11,507,199 B2 | 11/2022 | Melanson |
| 11,536,758 B2 | 12/2022 | Wardlaw et al. |
| 11,537,219 B2 | 12/2022 | Borodin et al. |
| 11,537,242 B2 | 12/2022 | Das et al. |
| 11,619,519 B2 | 4/2023 | Lapointe et al. |
| 11,721,463 B2 | 8/2023 | Valverde et al. |
| 11,775,170 B2* | 10/2023 | Cho ......................... G06F 3/016 |
| | | 715/773 |
| 11,836,290 B2 | 12/2023 | Kost et al. |
| 11,868,540 B2 | 1/2024 | Hellman |
| 11,880,506 B2* | 1/2024 | Rosenberg ............. G06F 3/016 |
| 11,921,930 B1* | 3/2024 | Chou ...................... G06F 3/016 |
| 12,130,159 B2 | 10/2024 | Maru et al. |
| 12,176,143 B2 | 12/2024 | Valverde et al. |
| 12,366,932 B2 | 7/2025 | Yancey et al. |
| 12,418,289 B1* | 9/2025 | Chen .................. H03K 17/7955 |
| 12,442,683 B2 | 10/2025 | Wardlaw et al. |
| 12,463,643 B2 | 11/2025 | Yancey et al. |
| 12,524,084 B2* | 1/2026 | Valverde ............. G06F 3/03543 |
| 2002/0080112 A1 | 6/2002 | Braun et al. |
| 2002/0084986 A1 | 7/2002 | Armstrong |
| 2005/0156892 A1* | 7/2005 | Grant .................... A63F 13/218 |
| | | 345/167 |
| 2005/0162389 A1* | 7/2005 | Obermeyer ........... G06F 3/0338 |
| | | 345/161 |
| 2009/0201248 A1 | 8/2009 | Negulescu et al. |
| 2012/0139841 A1* | 6/2012 | Taylor ................. G06F 3/03543 |
| | | 345/168 |
| 2012/0215475 A1 | 8/2012 | Rutledge et al. |
| 2013/0154942 A1 | 6/2013 | Okada |
| 2016/0175711 A1 | 6/2016 | Billington et al. |
| 2016/0179200 A1 | 6/2016 | Billington et al. |
| 2017/0249024 A1* | 8/2017 | Jackson .............. G06F 3/03543 |
| 2017/0262083 A1 | 9/2017 | Huang et al. |
| 2017/0357319 A1 | 12/2017 | Chaudhri et al. |
| 2019/0079584 A1* | 3/2019 | Bonanno ............. G06F 3/03543 |
| 2020/0045044 A1* | 2/2020 | Turgeman ........... G06F 3/03543 |
| 2020/0271477 A1 | 8/2020 | Kost et al. |
| 2020/0409478 A1* | 12/2020 | Shastri ................ G06F 3/03543 |
| 2021/0018993 A1 | 1/2021 | Odgers et al. |
| 2021/0318764 A1 | 10/2021 | Knoppert et al. |
| 2022/0171470 A1* | 6/2022 | Drezet .................... G06F 3/016 |
| 2022/0296996 A1* | 9/2022 | Soelberg ................. A63F 13/22 |
| 2023/0090674 A1 | 3/2023 | Lee |
| 2023/0197323 A1* | 6/2023 | Valverde ................... H01F 7/04 |
| | | 335/284 |
| 2023/0400938 A1* | 12/2023 | Goh ........................ G06F 3/038 |
| 2024/0004472 A1 | 1/2024 | Bajaj et al. |
| 2024/0256471 A1* | 8/2024 | Morrison .............. G06F 13/102 |
| 2024/0288942 A1* | 8/2024 | Justin ...................... G06F 3/038 |
| 2024/0419263 A1* | 12/2024 | Stoeckli ............... G06F 3/0362 |
| 2025/0068243 A1 | 2/2025 | Valverde et al. |
| 2025/0068244 A1* | 2/2025 | Valverde ............. G06F 3/03543 |
| 2025/0147540 A1 | 5/2025 | Barzen et al. |

OTHER PUBLICATIONS

U.S. Appl. No. 19/197,882, "Notice of Allowance", Apr. 27, 2026, 10 pages.
U.S. Appl. No. 19/224,566, "Notice of Allowance", Apr. 7, 2026, 9 pages.

* cited by examiner

1200

1220

1230

1210

1250

1260

1270

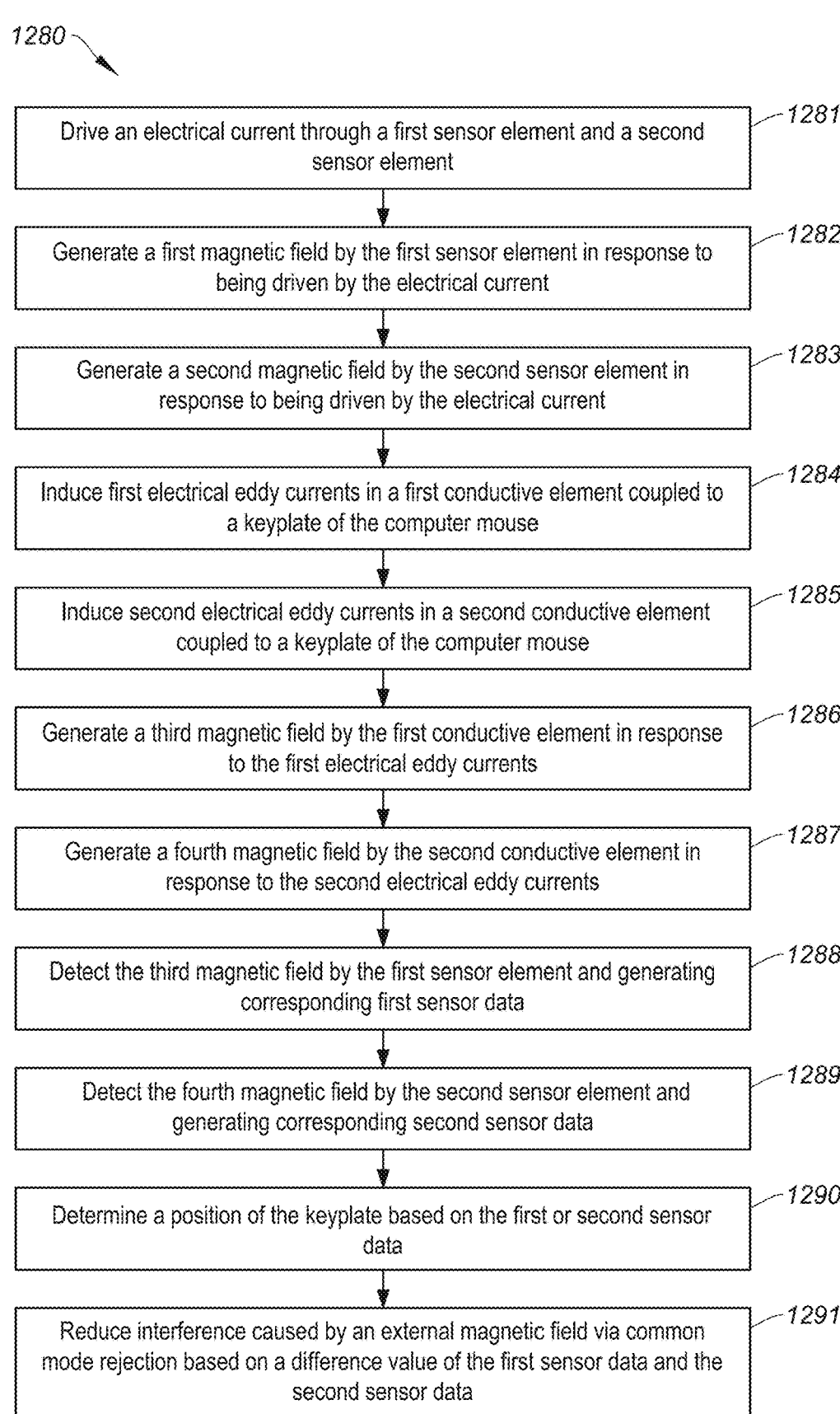

1280

Drive an electrical current through a first sensor element and a second sensor element — 1281

Generate a first magnetic field by the first sensor element in response to being driven by the electrical current — 1282

Generate a second magnetic field by the second sensor element in response to being driven by the electrical current — 1283

Induce first electrical eddy currents in a first conductive element coupled to a keyplate of the computer mouse — 1284

Induce second electrical eddy currents in a second conductive element coupled to a keyplate of the computer mouse — 1285

Generate a third magnetic field by the first conductive element in response to the first electrical eddy currents — 1286

Generate a fourth magnetic field by the second conductive element in response to the second electrical eddy currents — 1287

Detect the third magnetic field by the first sensor element and generating corresponding first sensor data — 1288

Detect the fourth magnetic field by the second sensor element and generating corresponding second sensor data — 1289

Determine a position of the keyplate based on the first or second sensor data — 1290

Reduce interference caused by an external magnetic field via common mode rejection based on a difference value of the first sensor data and the second sensor data — 1291

FIG. 12C

Fast Activation - Position vs Speed Threshold

Click Trigger Thresholds Evaluation:

SLOW CLICKS

FAST CLICKS

Determine position of conductive element relative to sensor element based on sensor data — 2010

Determine velocity of conductive element relative to sensor element based on sensor data — 2020

Determine key press and key release events of keyplate based on the position and velocity of conductive element relative to sensor element — 2030

ANALOG COMPUTER PERIPHERAL DEVICE WITH HAPTIC FEEDBACK

BACKGROUND

Computer mice are computer peripheral devices that are typically used to control aspects of a host computing device, such as a cursor on a graphical user interface (GUI). There have been many useful innovations with computer mouse over the last few decades including improved tracking (e.g., optical tracking), acceleration and/or momentum tracking (e.g., via inertial measurement unit (IMU)), enhanced functions (e.g., pressable scroll wheel, programmable buttons, etc.), as well as ergonomic improvements and more.

Despite the many improvements in performance and ergonomics, one mainstay has been the use of switches to provide different types of feedback profiles (e.g., tactile, clicky, linear) that users have become accustomed to. Despite their good user experience (UX) characteristics, their conventional binary operation can be limiting. Better solutions are needed.

BRIEF SUMMARY

In some embodiments, a computer mouse comprises: a keyplate; a target coupled to the keyplate; a sensor element configured to detect the target and generate sensor data corresponding to the detected target; and one or more processors configured to: determine a position of the target relative to the sensor element based on the sensor data; and determine key press and key release events of the keyplate based on the determined position of the target relative to the sensor element. The one or more processors can further configured to adjust a position trigger threshold that changes a resolution of the determining of the position of the target. In some cases, the position trigger threshold ranges between 0.01 mm-1 mm. In some embodiments, the one or more processors are further configured to determine a velocity of the target relative to the sensor element based on the sensor data, wherein determining the key press and key release events of the keyplate are further based on the determined velocity of the target relative to the sensor element. The one or more processors can be further configured to adjust a velocity trigger threshold that changes a resolution of the determining of the velocity of the target. In some embodiments, the velocity trigger threshold can be set at a range between 1 mm/s to 30 mm/s, though other settings and ranges are possible. In some embodiments, the one or more processors are further configured to determine an acceleration of the target relative to the sensor element based on the sensor data, wherein determining the key press and key release events of the keyplate are further based on the determined acceleration of the target relative to the sensor element. In some embodiments, the one or more processors are further configured to adjust an acceleration trigger threshold that changes a resolution of the determining of the acceleration of the target. The acceleration trigger threshold can range between 0.1 m/s$^2$ to 10 m/s$^2$, although other ranges and settings are possible. In certain embodiments, the one or more processors are further configured to determine a jerk of the target relative to the sensor element based on the sensor data, wherein determining the key press and key release events of the keyplate are further based on the determined jerk of the target relative to the sensor element. In some cases, the one or more processors are further configured to adjust a jerk trigger threshold that changes a resolution of the determining of the jerk of the target, wherein the jerk trigger threshold can range between 5 m/s$^3$ to 500 m/s$^3$. The sensor can be one or more of an inductive sensor, an optical sensor, a capacitive sensor, a magnetic sensor, or a force sensor. In some cases, the target can be an electrically conductive element. The sensor element can be an inductive coil. In some aspects, the sensor element(s) is an inductive coil is configured to: induce electrical eddy currents in the conductive element; detect a resulting magnetic field; and generate the sensor data based on the detected resulting magnetic field. The computer mouse can further include a second sensor element configured to detect an acceleration of the target and generate sensor data corresponding to the detected target, wherein determining the key press and key release events of the keyplate are further based on the determined acceleration of the target relative to the second sensor element. The second sensor element can be an inertial measurement unit (IMU), a MEMS device, or other suitable acceleration detection element or system.

In some embodiments, a computer mouse includes a keyplate; a target coupled to the keyplate; a sensor element configured to detect the target and generate sensor data corresponding to the detected target; and one or more processors configured to: determine a position of the target relative to the sensor element based on the sensor data; and determine a derivative measurement of the position of the target relative to the sensor element based on the sensor data; and determine key press and key release events of the keyplate based on the position and derivative measurement of the target relative to the sensor element. The one or more processors can be further configured to: adjust a position trigger threshold that changes a resolution of the determining of the position of the target; and adjust a derivative measurement trigger threshold that changes a resolution of the determining of the position of the target, wherein the derivative measurement is at least one of: a velocity of the target; an acceleration of the target; or a jerk of the target.

In some embodiments, a method of operating a computer mouse includes: determining, by a sensor element, a position of a target relative to the sensor element based on sensor data, wherein the target is coupled to a keyplate of the computer mouse; and determining key press and key release events of the keyplate based on the determined position of the target relative to the sensor element. The method can further include determine a derivative measurement of the position of the target relative to the sensor element based on the sensor data, wherein the determining the key press and key release events of the keyplate are further based on the derivative measurement of the target. In some cases, the method can include modifying a position trigger threshold that changes a resolution of the determining of the position of the target (e.g., number of steps, as shown in FIGS. 15-16) based on a movement sensor that tracks a movement of the computer mouse; an accelerometer of the computer mouse, or any other suitable sensor. One of ordinary skill in the art with the benefit of this disclosure would appreciate the many modifications, variations, and alternative embodiments thereof.

In some embodiments, a computer mouse comprises: a keyplate; a first conductive element (a first "target") coupled to the keyplate; a second conductive element (a second "target") coupled to the keyplate; a first sensor element configured to detect a first magnetic field generated by the first conductive element and generate corresponding first sensor data; a second sensor element configured to detect a second magnetic field generated by the second conductive element and generate corresponding second sensor data; and one or more processors configured to: determine a position of the keyplate based on the first or second sensor data; and mitigate interference caused by an external magnetic field via common mode rejection based on a difference value of the first sensor data and the second sensor data. In some cases, the first sensor element is an inductive coil configured to: induce electrical eddy currents in the first conductive element; detect a resulting first magnetic field; and generate the first sensor data based on the detected resulting first magnetic field, and wherein the second sensor element is an inductive coil configured to: induce electrical eddy currents in the second conductive element; detect a resulting second magnetic field; and generate the second sensor data based on the detected resulting second magnetic field. In some embodiments, the first sensor element is an inductive coil wound in a clockwise direction, and the second sensor element is an inductive coil wound in a counter-clockwise direction. In some cases, the first magnetic field is of a first polarity, and the second magnetic field is of a second polarity opposite the first polarity. In certain embodiments, the first conductive element and the second conductive element are electrically coupled together. The first and second conductive elements can be physically coupled together as a monolithic structure or they may be separate. In some cases, the first sensor element and the second sensor element are comprised of a single, common conductive element connected in series. In some embodiments, the difference value of the first sensor data and second sensor data is greater in amplitude than either of the first sensor data and second sensor data, and wherein the different value of the external magnetic measured by both the first and second sensor elements is lesser in amplitude than the received external magnetic field.

In some embodiments, a method of operating a computer mouse comprises: driving an electrical current through a first sensor element and a second sensor element; generating a first magnetic field by the first sensor element in response to being driven by the electrical current; generating a second magnetic field by the second sensor element in response to being driven by the electrical current; inducing first electrical eddy currents in a first conductive element coupled to a keyplate of the computer mouse, the induced first electrical eddy currents caused by a first magnetic field; inducing second electrical eddy currents in a second conductive element coupled to a keyplate of the computer mouse, the induced second electrical eddy currents caused by a second magnetic field; generating a third magnetic field by the first conductive element in response to the first electrical eddy currents; generating a fourth magnetic field by the second conductive element in response to the second electrical eddy currents; detecting the third magnetic field by the first sensor element and generating corresponding first sensor data; detecting the fourth magnetic field by the second sensor element and generating corresponding second sensor data; determining a position of the keyplate based on the first or second sensor data; and reducing interference caused by an external magnetic field via common mode rejection based on a difference value of the first sensor data and the second sensor data. In some aspects, the first sensor element is an inductive coil wound in a clockwise direction, and the second sensor element is an inductive coil wound in a counter-clockwise direction. In some embodiments, the first magnetic field is of a first polarity, and the second magnetic field is of a second polarity opposite the first polarity. In certain embodiments, the first conductive element and the second conductive element are electrically coupled together. In some cases, the first and second conductive elements are physically coupled together as a monolithic structure. In some embodiments, the first sensor element and the second sensor element are comprised of a single, common conductive element connected in series.

In certain embodiments, an input device comprises: a button; a conductive element coupled to the button; a substrate; a single conductor coupled to the substrate, the single conductor configured into: a first coil; and a second coil configured adjacent to and in series with the first coil; a first sensor element configured to detect a first magnetic field generated by the conductive element and generate corresponding first sensor data; a second sensor element configured to detect a second magnetic field generated by the conductive element and generate corresponding second sensor data; and one or more processors configured to: determine a position of the button based on the first or second sensor data; and mitigate interference caused by an external magnetic field via common mode rejection based on a difference value of the first sensor data and the second sensor data. In some embodiments, the first coil is configured to: induce electrical eddy currents in the conductive element; detect a resulting first magnetic field from the conductive element; and generate the first sensor data based on the detected resulting first magnetic field, and wherein the second coil is configured to: induce electrical eddy currents in the conductive element; detect a resulting second magnetic field from the conductive element; and generate the second sensor data based on the detected resulting second magnetic field. In certain embodiments, the first coil is wound in a clockwise direction, and wherein the second coil is wound in a counter-clockwise direction. In some embodiments, the first magnetic field is of a first polarity, and the second magnetic field is of a second polarity opposite the first polarity. In some cases, the input device may be a computer mouse, and the button may be a keyplate. In some embodiments, the difference value of the first sensor data and second sensor data is greater in amplitude than either of the first sensor data and second sensor data, and the difference value of the external magnetic field measured by both the first and second sensor elements is lesser in amplitude than the received external magnetic field. In further embodiments, the difference in value of the first sensor data and the second sensor data when influenced by an external magnetic field is lesser in amplitude than the influence of this external magnetic field on either the first sensor data or second sensor data. Any suitable method of using common mode signals to mitigate unwanted external magnetic fields can be used, as would be appreciated by one of ordinary skill in the art with the benefit of this disclosure.

In certain embodiments, a switchless computer mouse comprises: a keyplate operable to be depressed over a range of motion; a target coupled to the keyplate; a sensor configured separate from the target; a haptic element; and one or more processors operable to: control the sensor to detect a position of the target over the keyplate range of motion; and control the haptic element to generate a haptic feedback when the sensor detects that the position of the target corresponds to a threshold position within the range of motion. In some embodiments, the one or more processors cause the haptic element to generate a first type of haptic feedback when the threshold position is met from a first direction, and wherein the one or more processors cause the haptic element to generate a second type of haptic feedback when the threshold position is met from a second direction opposite the first direction. In some cases, the haptic element generates the haptic feedback and couples the haptic feedback to a user accessible portion of the computer mouse. In some cases, the user accessible portion is the keyplate, a palm rest region, or other suitable portion of the switchless computer mouse. The haptic element can be one or more a linear resonance actuators (LRA), piezo elements, electromagnet, solenoid, motors, or other haptic generating device, as would be appreciated by one of ordinary skill in the art with the benefit of this disclosure. A switchless computer mouse, as described throughout this disclosure, refers to a computer mouse that does not use or include a switch (e.g., microswitch) to instantiate a keypress. For instance, conventional mice often use a microswitch configured under a keyplate that is activated when a suitable force (e.g., 60 gf) is imparted on it by the keyplate. A switchless computer mouse does not use a microswitch for activation of the keyswitch (or other suitable depressible element) and is generally not present in the design of the computer mouse, and particularly not under the keyswitch, and activation is determined based on, e.g., a position or derivative thereof of the keyplate, like the embodiments presented herein and not whether a keyswitch is activated. In some cases, the one or more processors are further configured to control the haptic element to generate a second haptic feedback when the sensor detects that the position of the target corresponds to a second threshold position within the range of motion different than the threshold position. In some aspects, the sensor is one or more of an inductive sensor, an optical sensor, a capacitive sensor, or a magnetic sensor. In some cases, the target is an electrically conductive element.

In some embodiments, a switchless computer mouse comprises: a keyplate operable to be depressed over a range of motion; a target coupled to the keyplate; a sensor configured separate from the target; a haptic element; and one or more processors operable to: control the sensor to detect a movement of the target over the keyplate range of motion; and control the haptic element to generate a haptic feedback when the sensor detects that the movement of the target corresponds to a threshold value. In some aspects, the sensor generates sensor data corresponding to a position of the target relative to the sensor, a velocity of the target relative to the sensor, an acceleration of the target relative to the sensor, and/or a jerk of the target relative to the sensor, and any suitable combination thereof (e.g., can be a single metric, such as position, or multiple metrics such as position and velocity or acceleration). In some cases, the haptic element generates the haptic feedback and couples the haptic feedback to a user accessible portion of the computer mouse. In some embodiments, the user accessible portion is the keyplate or other suitable portion of the switchless computer mouse and typically an area that can impart haptic energy to a user of the mouse. The haptic element can be one or more a linear resonance actuators (LRA), piezo elements, motors, or other haptic generating device, as would be appreciated by one of ordinary skill in the art with the benefit of this disclosure. The sensor can be one or more of an inductive sensor, an optical sensor, a capacitive sensor, or a magnetic sensor. The target may be an electrically conductive element.

In certain embodiments, a switchless computer mouse comprises: a keyplate operable to be depressed over a range of motion; a target coupled to the keyplate; a first sensor configured separate from the target; a second sensor coupled to the target; and one or more processors operable to: control the first sensor to detect a first type of movement of the target over the keyplate range of motion; and control the second sensor to detect a second type of movement of the target over the keyplate range of motion. The first sensor can be configured to detect a position of the target relative to the first sensor. The second sensor can be configured to detect an acceleration of the target. The switchless computer mouse can further comprise a haptic element, wherein the one or more processors are further operable to control the haptic element to generate a haptic feedback when: the first sensor detects that the position of the target has moved by at least a first threshold value; and the second sensor detects that an acceleration of the target is at least a second threshold value.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 12C is a simplified flow chart showing aspects of a method for mitigating deleterious effects of external magnetic fields in a computer peripheral device, according to certain embodiments;

FIG. 18 shows key press trigger thresholds for fast clicks, according to certain embodiments;

FIG. 19 shows key press trigger thresholds for slow clicks, according to certain embodiments.

Throughout the drawings, it should be noted that like reference numbers are typically used to depict the same or similar elements, features, and structures.

DETAILED DESCRIPTION

Figure 1:
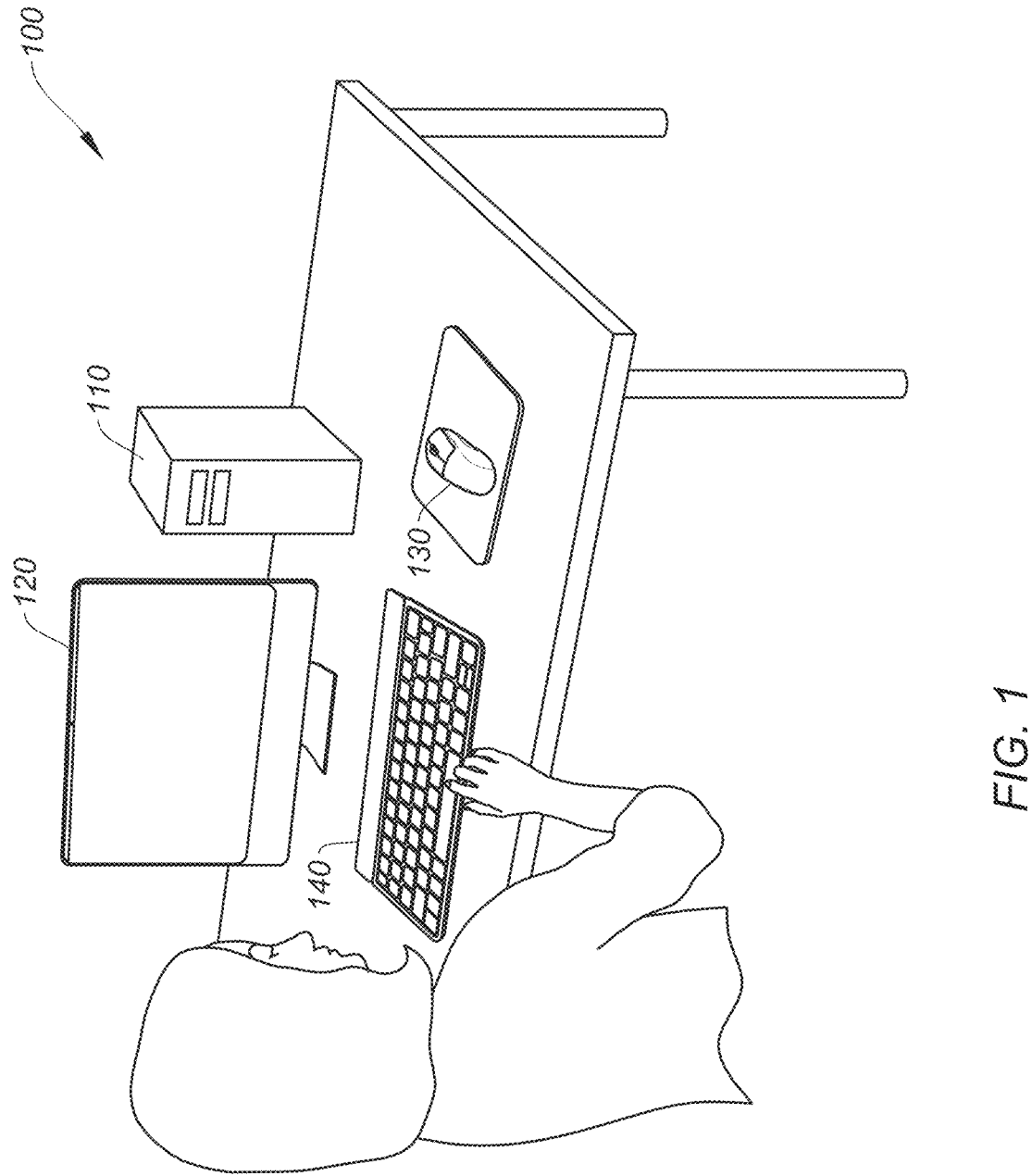
FIG. 1 shows a simplified example of a computer system that can include any of a variety of host computing devices and computer peripheral devices, including computer peripheral devices (e.g., a computer mouse) that can be configured to perform aspects of the various inventive concepts described herein.

Aspects of the present disclosure relate generally to computer peripheral devices, and more particularly to computer peripheral devices with analog detection, according to certain embodiments.

In the following description, various examples of computer peripheral devices (e.g., computer mice) with analog detection are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high-level summary is intended to provide a basic understanding of some of the novel innovations depicted in the figures and presented in the corresponding descriptions provided below. Aspects of the invention include several inventive concepts that generally relate to computer mice, but may be applied to other computer peripheral devices as would be appreciated by one of ordinary skill in the art with the benefit of this disclosure. In some embodiments, a switchless computer mouse (e.g., no switch is used to instantiate a key press) can include a keyplate operable to be depressed over a range of motion, a conductive element (also referred to as a "target") coupled to the keyplate, a sensor (e.g., inductive coil) configured separate from the conductive element, a haptic element (e.g., linear resonance actuator (LRA) or piezo device), and one or more processors (e.g., in the computer mouse and/or on a communicatively coupled host computing device) operable to control the sensor to detect a position of the conductive element over the keyplate range of motion (a typical keyplate range of motion is between 0.5 mm and 1 mm of travel, although other longer or shorter ranges are possible) and control the haptic element to generate a haptic feedback when the sensor detects that the position of the conductive element corresponds to a preset threshold position within the range of motion. Put simply, some embodiments include a switchless computer mouse that detects a position of the keyplate (via a target coupled thereto) along its range of motion and can generate a haptic feedback to the user, such as a "bump" or other physical feedback, when a threshold position is reached. Some embodiments of switchless computer mice can include multiple thresholds over the same range of motion where different haptic feedback types (e.g., different vibration patterns, frequency, amplitude, etc.) may be applied to different thresholds, from passing through the thresholds from above or below (e.g., press and release), on different keyplates (e.g., left and right buttons on the computer mouse), or the like. Besides the technical advantages of the use of multiple customizable thresholds, multiple feedback types, and not requiring a keyswitch for actuation, other non-limiting technical advantages of switchless designs include better reliability (e.g., the sensing is not galvanic, not subject to wear, and dust resistant), an ability to calibrate the actuation position, which allows for a more consistent trigger threshold across devices at scale, and a less subject to a manufacturing tolerance stack (e.g., the keyplate can be preloaded to a top-position of the chassis, whereas switch-based designs often include an additional bias mechanism to preload switches, which typically results in keyplate heights to be inconsistent. In some cases, where no bias mechanism or foam is used, the actuation can be inconsistent because of too much pretravel). Some switchless embodiments are further discussed below at least with respect to FIG. 5-7.

In certain embodiments, a switchless computer mouse may include a novel architectural configuration of sensors that can reduce interference by ambient magnetic fields that can otherwise affect the ability to detect a position (and/or velocity, acceleration, jerk) of a keyplate. Such embodiments can comprise: a keyplate, a first conductive element (e.g., a target) coupled to the keyplate, a second conductive element coupled to the keyplate, a first sensor element (e.g., an inductive coil) configured to detect a first magnetic field generated by the first conductive element and generate first sensor data, a second sensor element configured to detect a second magnetic field generated by the second conductive element and generate second sensor data, and one or more processors configured to: determine a position of the keyplate based on the first sensor data, mitigate interference by a third ambient magnetic field via common mode rejection based on a difference value of the first sensor data and the second sensor data. In some implementations, the first and second sensor elements can be coupled together in a common-mode configuration. That is, a single conductor may include a first section wound into a coil in a first direction, and a second section wound into a coil in a second direction opposite the first direction. The first and second sections are series connected and are operable to have a built-in common mode rejection of external magnetic fields due to the oppo- site adjacent windings of the first and second sections. In some aspects, separate sensors (e.g., not wound from the same conductor) may be used. In some embodiments, the first and second sensors can be configured on a same monolithic substrate (see, e.g., FIGS. 9B, 11B), although other implementations are possible, as would be appreciated by one of ordinary skill in the art with the benefit of this disclosure.

In some embodiments of switchless computer mice (or other related computer peripheral devices), position detec- tion can be generally reliable, but high performance func- tions, such as fast activation functionality, which may be commonplace in e-sports and gaming scenarios, may cause false positive button press detection when overly sensitive, or may not be sensitive enough to detect intended press and/or release events. Fast activation, or "fast trigger" (also referred to by other names) if a feature that eliminates the need for a full key press and release at a fixed threshold to register a key press. Instead, small press/release movements can be detected and interpreted as key presses and releases and may be independent of any preset threshold, as would be appreciated by one of ordinary skill in the art with the benefit of this disclosure. As presented herein, a more reliable and robust detection scheme can be realized by using different detection metrics, including position, velocity, acceleration, and/or jerk, as a way to better interpret a user's intended action. In such embodiments, a switchless computer mouse can include a keyplate, a conductive element coupled to the keyplate, a sensor element configured to detect a magnetic field of the conductive element and generate sensor data corresponding to the detected magnetic field, and one or more processors configured to: determine a position of the conductive element relative to the sensor element based on the sensor data; determine a velocity (e.g., and/or position, acceleration, jerk) of the conductive element relative to the sensor element based on the sensor data; and determine key press and key release events of the keyplate based on, e.g., the position and velocity (and acceleration and/or jerk in some embodiments) of the conductive element relative to the sensor element. This is further discussed below, at least with respect to FIGS. 13-20.

It is to be understood that this high-level summary is presented to provide the reader with a baseline understand- ing of some of the novel aspects of the present disclosure and a roadmap to the details that follow. This high-level summary in no way limits the scope of the various embodi- ments described throughout the detailed description and each of the figures referenced above are further described below in greater detail and in their proper scope.

FIG. 1 shows a simplified example of a computer system 100 that can include any of a variety of host computing devices and computer peripheral devices, including com- puter peripheral devices (e.g., a computer mouse) that can be configured to perform aspects of the various inventive concepts described herein. Computer system 100 can include computer 110, monitor 120, input device 130, and keyboard 140. In some embodiments, input device 130 can be a computer mouse, a remote-control device, a game controller (e.g., game pad, joystick, flight stick, etc.) or elements thereof (e.g., hat switch), a media controller device, or other suitable device that can be used to convert analog inputs into digital signals for computer processing. In some cases, keyboard 140 can be a "QWERTY" style keyboard, or any suitable input device (e.g., internet-of- things device, AR/VR controller, or the like). For computer system 100, input device 130 and keyboard 140 can be configured to control various aspects of computer 110 and monitor 120, as would be appreciated by one of ordinary skill in the art with the benefit of this disclosure. Monitor 120, input device 130, and keyboard 140 may be referred to as "computer peripheral devices." Computer peripheral devices 120-140 can be communicatively coupled to host computing device 110.

Computer 110 can be any suitable computing device including, but not limited to, a desktop computer, a laptop computer, a tablet or "phablet" computer, a smart phone, a PDA, a wearable device (e.g., smart watches, smart glasses), virtual reality/augmented reality (AR/VR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor 302 of FIG. 3) to control aspects of the host computing device, for instance, via the one or more computer peripheral devices.

Figure 2:
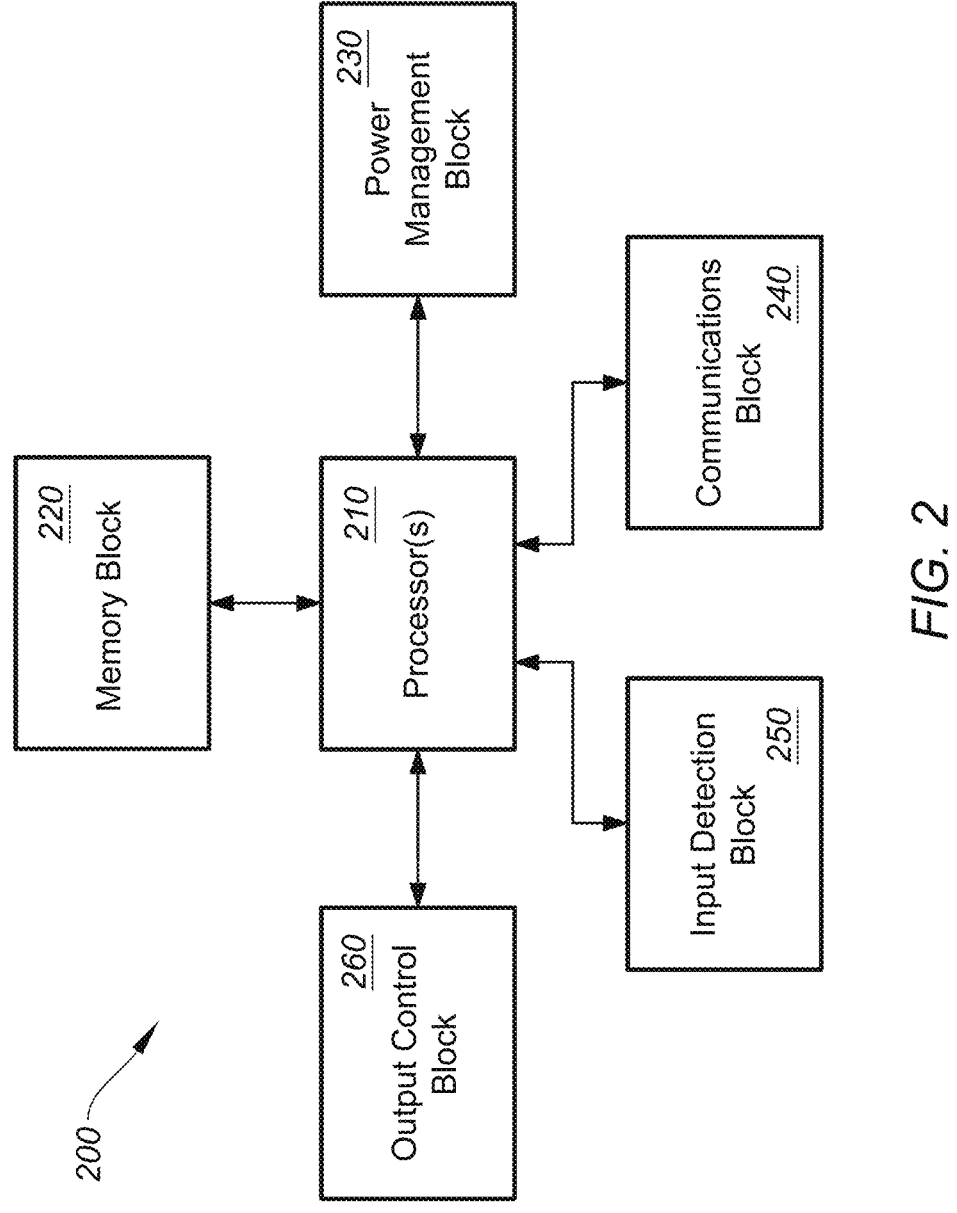
FIG. 2 shows a simplified block diagram for a system configured to operate a computer peripheral device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices shown or not shown herein but within the wide purview of the present disclosure. System 200 may include processor(s) 210, memory 220, power management system 230, commu- nication module 240, input detection system 250, and output control system 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 may be implemented as separate blocks, or alternatively, more than one system block may be imple- mented in a single block. In the context described herein, system 200 can be incorporated into any computer periph- eral devices (e.g., computer mouse 130, input devices gen- erally, or the like) described or mentioned herein, as would be appreciated by one of ordinary skill in the art with the benefit of this disclosure.

In certain embodiments, processor(s) 210 may include one or more microprocessors and can be configured to control the operation of system 200. Alternatively or addi- tionally, processor(s) 210 may include one or more micro- controllers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer mouse 130 (e.g., system blocks 220-260). Alternatively or additionally, some of system blocks 220-260 may include additional dedicated processor(s), which may work in conjunction with processor(s) 210. For instance, MCUs, pCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some embodiments, multiple processors may increase performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM), and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the computer peripheral device, such as a detected movement of the computer peripheral device, a sensor (e.g., optical sensor, accelerometer, movement sensors), activation of one or more input elements (e.g., key structures, buttons, sliders, touch-sensitive regions, etc.), or the like. In some aspects, stored data may be aggregated and sent via reports to a host computing device.

In certain embodiments, memory 220 can store the various data described throughout this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute various operations as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications system 240, etc.). In certain embodiments, the functions provided by power management system 230 may be incorporated into processor(s) 210. Alternatively, some embodiments may not include a dedicated power management system. For example, functional aspects of power management system 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection system 250, output control system 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection system 250 can control the detection of a user-interaction with input elements on an input device. For instance, input detection system 250 can detect user inputs from motion sensors, keys (e.g., smart key structures, conventional keys), or buttons (e.g., depressible elements), roller wheels, scroll wheels (e.g., rotation of a scroll wheel in a first (e.g., forward) and second (e.g., backward) direction, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), force sensing (e.g., detecting force on a scroll wheel to rotate in a first or second direction via a force sensitive element such as an FSR, piezo device, etc.), audio based detection such as voice input (e.g., via microphone), or the like, as would be appreciated by one of ordinary skill in the art with the benefit of this disclosure.

Alternatively, the functions of input detection system 250 or subset thereof can be subsumed by processor 210, or in combination therewith.

In some embodiments, input detection system 250 can detect a touch or touch gesture on one or more touch sensitive surfaces on computer mouse 130. Input detection system 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection system 250 can include touch and/or proximity sensing capabilities. Some examples of the types of touch/proximity sensors may include, but are not limited to, resistive sensors (e.g., air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection system 250 may include a movement tracking sub-block that can be configured to detect a relative displacement (movement tracking) of a computer peripheral device. For example, input detection system 250 optical sensor(s) such as IR LEDs and an imaging array of photo-diodes to detect a movement of a computer peripheral device relative to an underlying surface. A computer peripheral device may optionally include movement tracking hardware that utilizes coherent (laser) light. Moving tracking can provide positional data (e.g., delta X and delta Y data from last sampling) or lift detection data. For example, an optical sensor can detect when a user lifts the computer peripheral device (e.g., computer mouse 130) off of an underlying surface (also referred to as a "work surface") and can send that data to processor 210 for further processing. In some embodiments, processor 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," UNHD, or another device). Accelerometers can further determine if the computer peripheral device has been lifted off an underlying surface and can provide movement data that may include the velocity, physical orientation, and acceleration of a computer peripheral device. In some embodiments, gyroscope(s) can be used in lieu of or in conjunction with accelerometer(s) to determine movement or input device orientation.

In some embodiments, output control system 260 can control various outputs for a corresponding computer peripheral device. For instance, output control system 260 may control a number of visual output elements (e.g., LEDs, LCD or LED screens/keys), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular systems, it is to be understood that these systems are defined for convenience of description and are not intended to imply a particular physical arrangement of component parts. Further, the systems need not correspond to physically distinct components. Systems can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection system 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
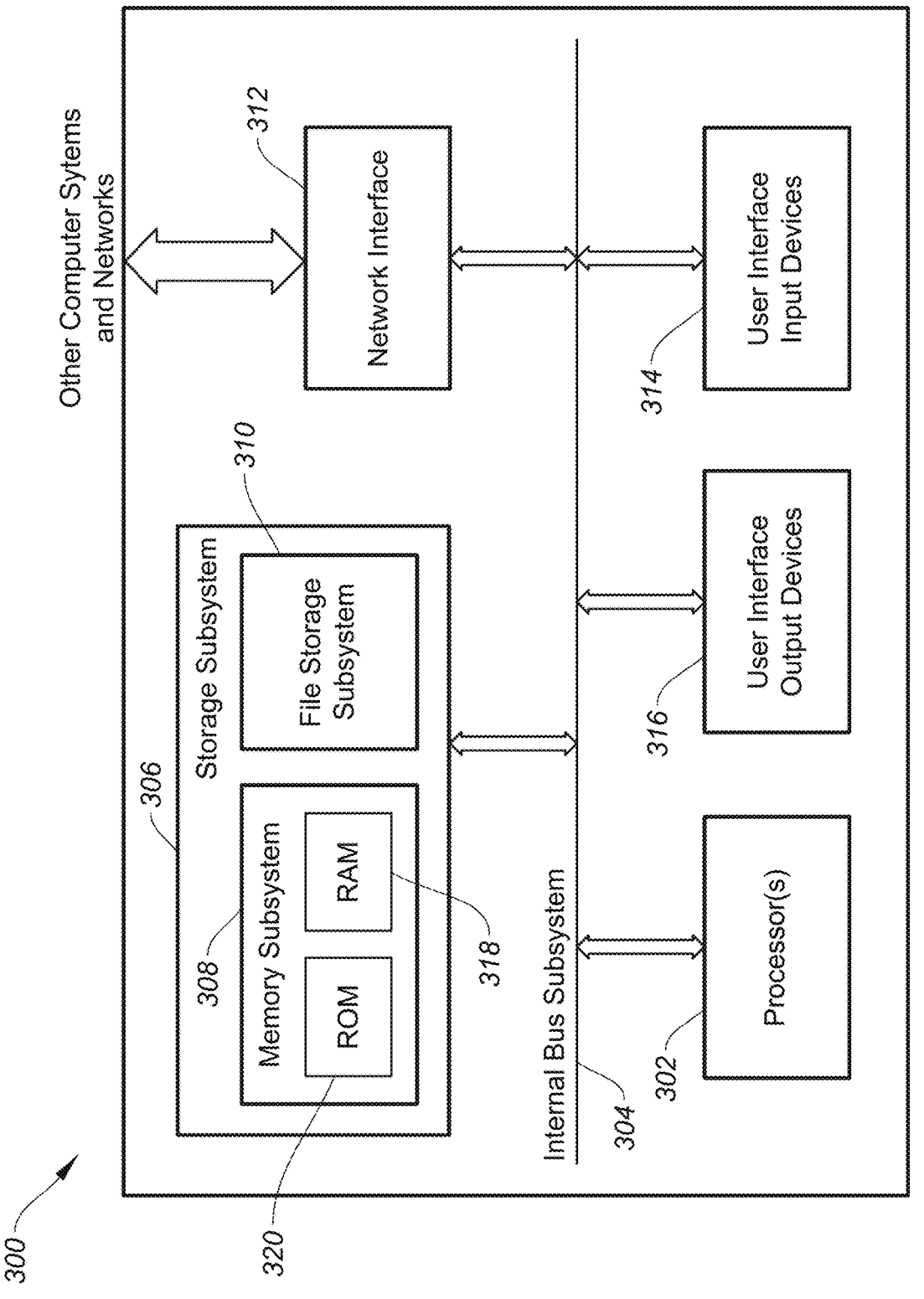
FIG. 3 is a simplified block diagram of a host computing device configured to operate a computer peripheral device, according to certain embodiments.

FIG. 3 is a simplified block diagram of a host computing device 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing any method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Switchless Analog Detection in a Computer Peripheral Device

In some embodiments, a switchless computer mouse can detect a position of a keyplate (via a target coupled thereto) along its range of motion and can generate a haptic feedback to the user, such as a "bump" or other physical feedback, when one or more threshold positions are reached. A switch, also referred to as a "microswitch," is used by conventional computer mice to instantiate a keypress and provide a feedback profile (e.g., a "click"), as would be appreciated by one of ordinary skill in the art with the benefit of this disclosure. Certain embodiments described herein are switchless computer mice that do not incorporate a switch, provide analog keypress detection via a sensor system, and in some embodiments, provide tactile feedback by way of a haptic feedback system.

Figure 4A:
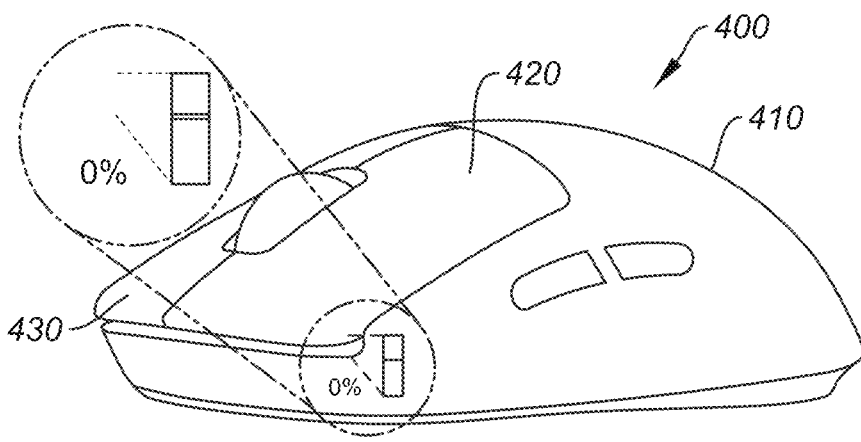
FIGS. 4A-4C show aspects of a switchless computer mouse with haptic feedback, according to certain embodiments.
Figure 4B:
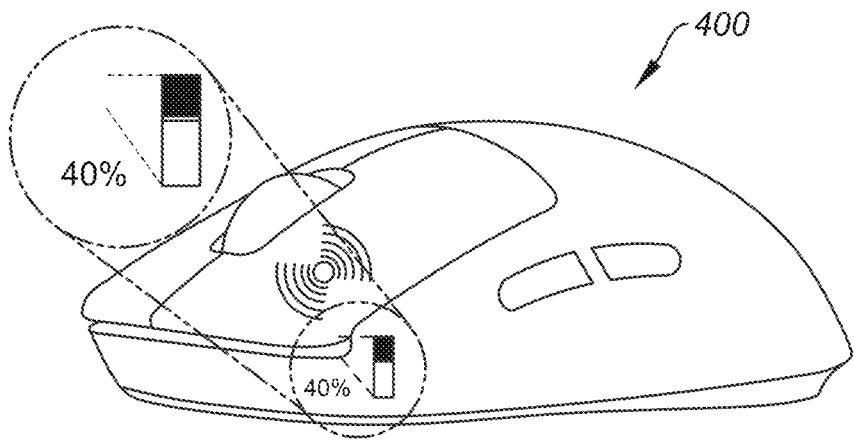
Figure 4C:
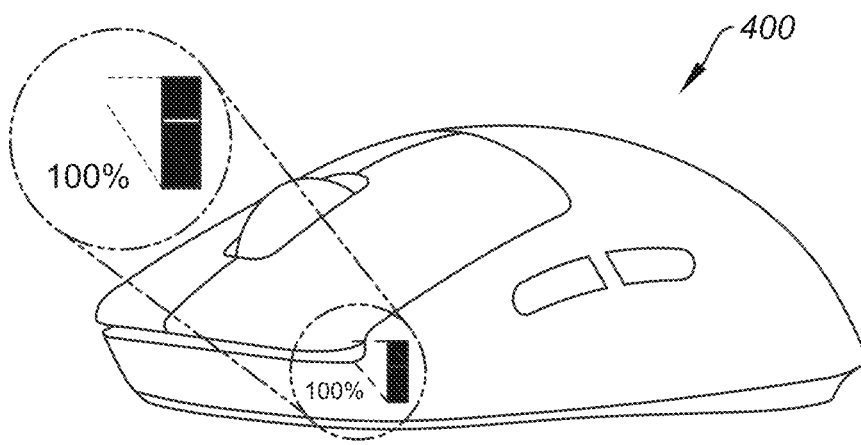

FIGS. 4A-4C show aspects of a switchless computer mouse 400 with haptic feedback, according to certain embodiments. Computer mouse 400 includes a housing 410 and depressible keyplates 420, 430. Each keyplate can include conductive element, also referred to as a target (not shown) and a sensor (e.g., inductive sensor) that can detect a position of the target relative to the sensor. When a keyplate reaches a threshold position, a haptic element (e.g., linear resonance actuator) can generate a haptic feedback that can be used to indicate a keypress to the user. The threshold position that instantiates a haptic feedback can be preset to any suitable position, there can be multiple threshold positions, and myriad types of feedback, as would be appreciated by one of ordinary skill in the art with the benefit of this disclosure. In short, the combination of keyplate position sensing with threshold(s) and haptic feedback can provide an exemplary analog keypress UX that provide more options, precision, and variability than conventional switch-based keyplate system. Referring back to FIG. 4A, keyplate 420 is not pressed. In FIG. 4B, keyplate 420 is pressed to a threshold position (e.g., at 40% (0.28 mm) of a 0.7 mm range of motion). In some embodiments described herein, the actuation point can be approximately 0.35 mm, but any suitable point can be set anywhere from 0.01 mm and 0.7 mm, e.g., the full range of motion. Referring back to FIG. 4B, a haptic feedback is generated indicating that a key press is instantiated. In FIG. 4C, keyplate 420 is maximally pressed at 100%. In some embodiments, another haptic feedback (e.g., same or different feedback) may be provided when the key is released and the threshold position is reached.

Figure 5:
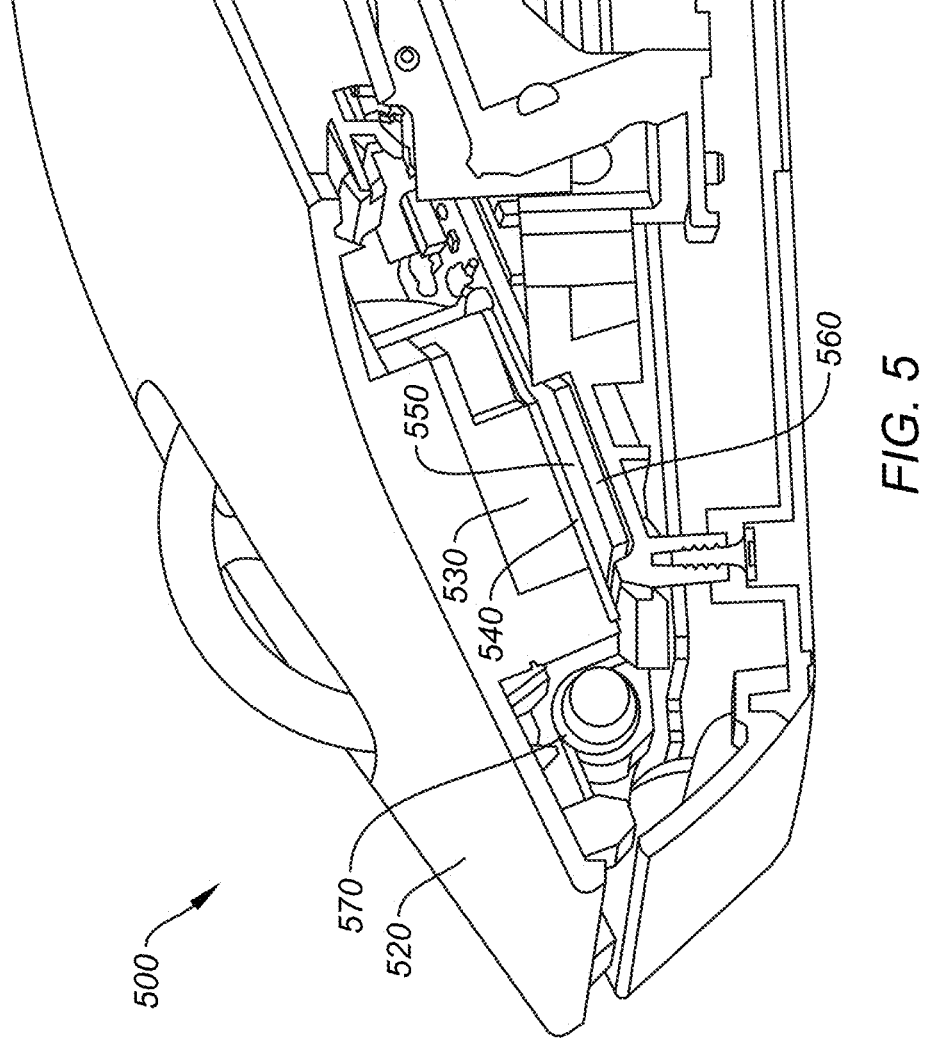
FIG. 5 shows a cross-sectional view of a switchless analog computer mouse, according to certain embodiments.

FIG. 5 shows a cross-sectional view of a switchless analog computer mouse 500, according to certain embodiments. Mouse 500 includes a keyplate 520 and actuator 520 coupled thereto. Actuator 520 (e.g., LRA, piezo, motor, etc.) may generate a haptic feedback that can be configured to activate when the keyplate (and/or target) moves to one or more threshold preset threshold position(s) over the range of motion. Target 540 can operate as a conductive target for inductive sensing. In some cases, target 540 may be configured to hold actuator 520 in place, as shown. PCB 550 may include an inductive coil 560 (the sensor) configured thereon (e.g., integrated with) or coupled thereto (as shown) to detect the position and/or distance of the target relative to the inductive coil, as described herein. Biasing mechanism 570 (e.g., torsion spring) can be used to provide a resistance to a keypress. In some embodiments, an upwards force of 60 gf is provided at 0.35 mm of travel along the range of motion. In some cases, the biasing mechanism can provide a preload force (e.g., 25 gf). Although the embodiment of FIG. 5 shows a specific implementation of inductive sensing, other sensing methods and infrastructure can be used including optical, magnetic, force measurement, and more, as would be appreciated by one of ordinary skill in the art with the benefit of this disclosure. Furthermore, in alternative embodiments, the target can be the haptic element itself such that the haptic element performs both the generation of a haptic feedback as described, and is comprised of an electrically conductive material and operates as the target.

Figure 6:
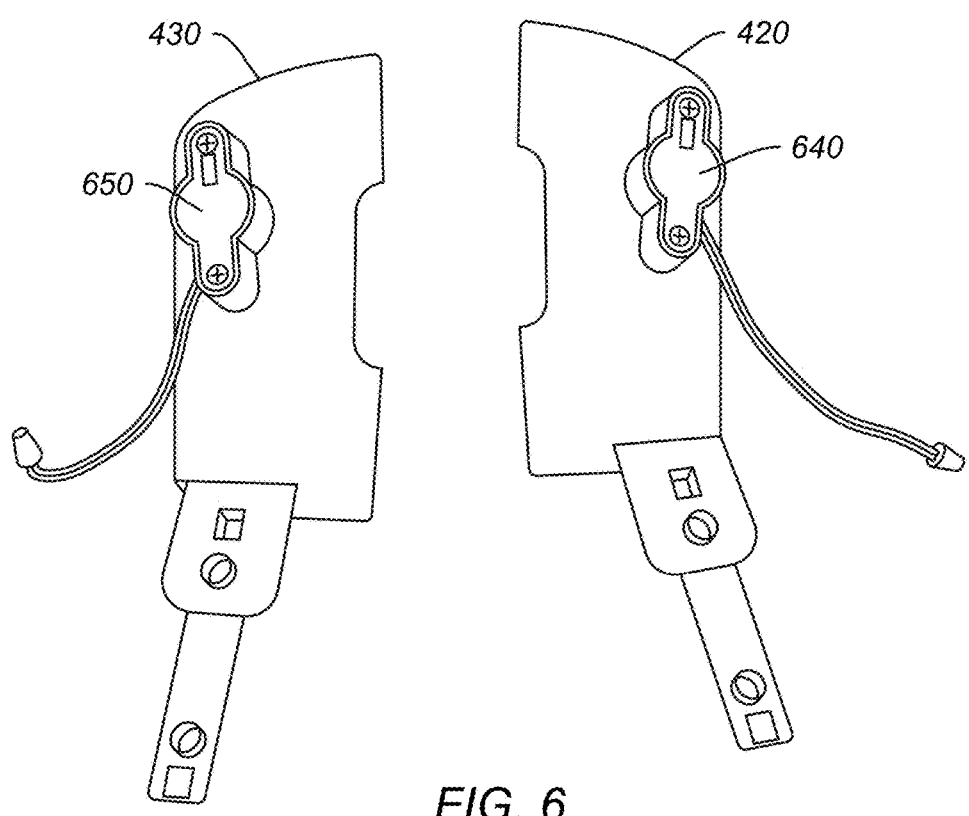
FIG. 6 shows computer mouse keyplates, according to certain embodiments.

FIG. 6 shows computer mouse keyplates, according to certain embodiments. Keyplates 420, 430 include linear resonance actuators (LRAs) 640, 650, respectively, coupled thereto. LRAs 640, 650 provide a haptic feedback to the user typically in response to the keyplate being pressed and/or released to one or more threshold positions. The haptic feedback can vary by amplitude, frequency, pattern, or the like.

Figure 7:
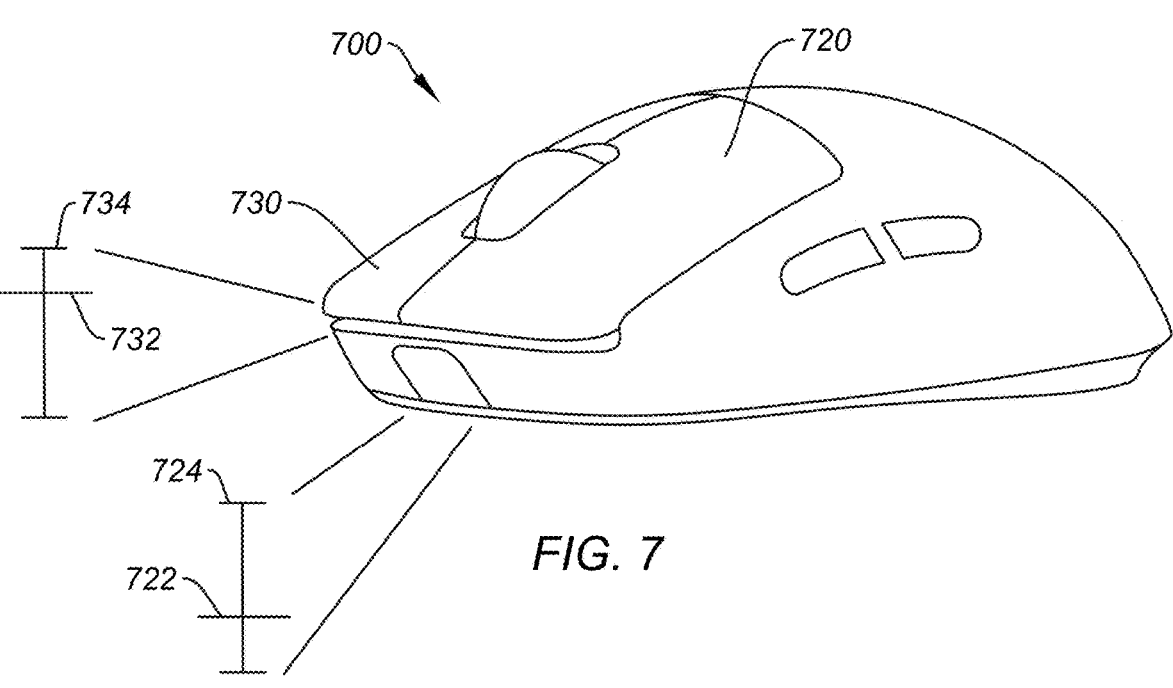
FIG. 7 shows a computer mouse with different thresholds for different keyplates, according to certain embodiments.

FIG. 7 shows a computer mouse 700 with different thresholds for different keyplates, according to certain embodiments. Each keyplate 720, 730 can be configured to trigger a haptic feedback when the keyplate is pressed to a threshold position 724, 734 that can be set anywhere along the keyplate range of motion, 722, 732, respectively. In some embodiments, a first threshold position may apply when a keyplate is depressed, and a second threshold position may apply when the keyplate is released. In some aspects, a dynamic threshold position can be used, for instance, with fast activation configurations where press/release thresholds change based on a current position of the keyplate, as further described below.

Figure 8:
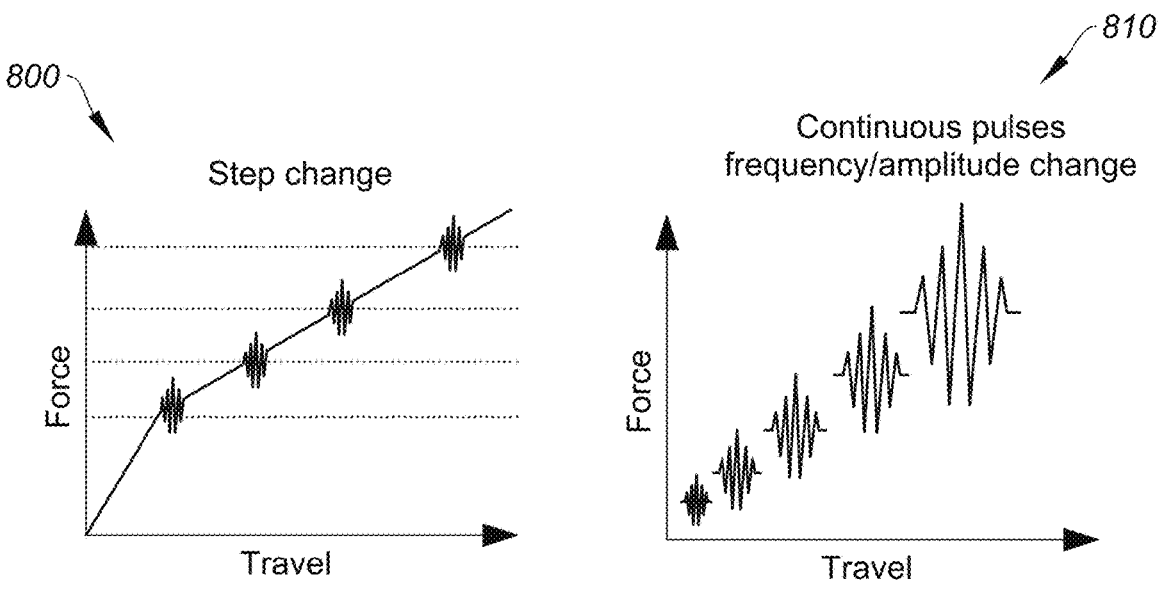
FIG. 8 shows a number of graphs that illustrate different types of haptic feedback that can be applied in switchless computer mice, according to certain embodiments.
Figure 8:
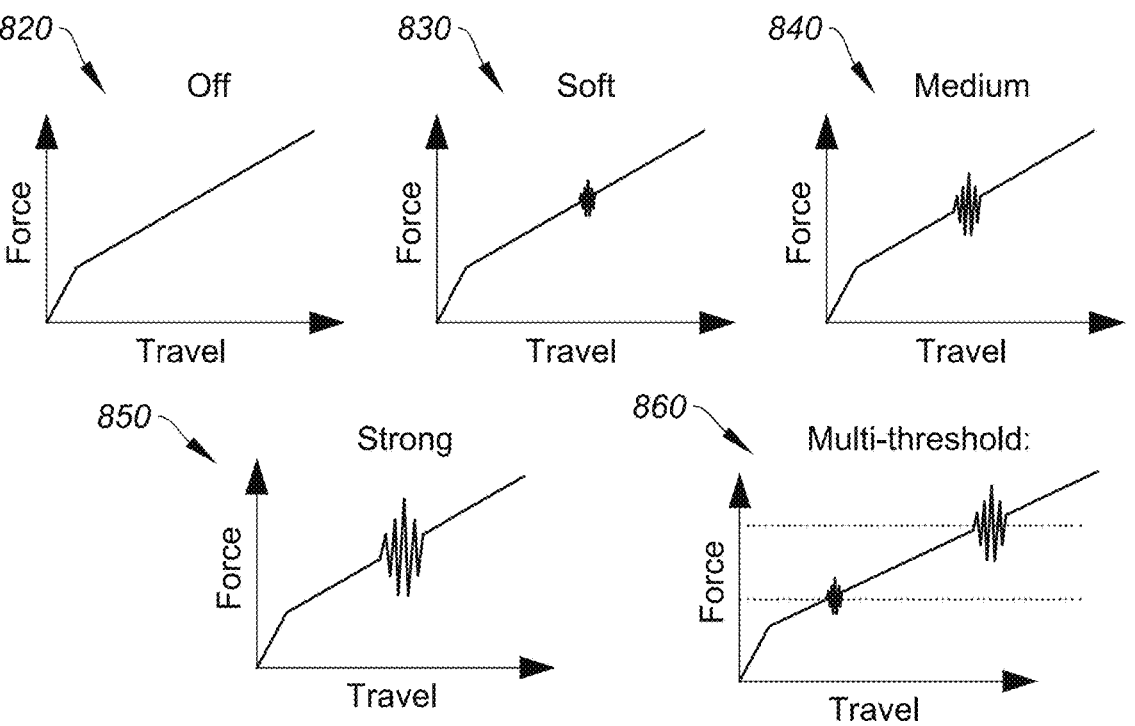

FIG. 8 shows a number of graphs that illustrate different types of haptic feedback that can be applied in switchless computer mice, according to certain embodiments. Each graph plots a force on the keyplate vs. a travel of the keyplate along its range of motion. Graph 800 shows a step change in a linear-type haptic feedback. As the force on the keyplate increases, a haptic feedback of any suitable amplitude and/or frequency is applied at preset intervals (steps) along the range of motion. Graph 810 shows a continuous increase in a linear-type haptic feedback. As the force on the keyplate increases, a haptic feedback of any suitable amplitude and/or frequency is continuously applied and increases at a linear or nonlinear rate along the range of motion. Graphs 820-850 show a tactile-type haptic feedback. Graph 820 shows no haptic feedback when a haptic feedback setting (e.g., amplitude and/or frequency) is off. Graphs 830, 840, 850 show soft, medium, and strong haptic feedback when a threshold position is reached. Graph 860 shows a tactile-type haptic feedback for when multiple threshold positions are reached. One of ordinary skill in the art with the benefit of this disclosure would appreciate the many modifications, variations, and alternative embodiments thereof.

In some non-limiting exemplary embodiments, a switchless computer mouse comprising a keyplate operable to be depressed over a range of motion; a conductive element coupled to the keyplate; a sensor configured separate from the conductive element; a haptic element; and one or more processors operable to: control the sensor to detect a position of the conductive element over the keyplate range of motion; and control the haptic element to generate a haptic feedback when the sensor detects that the position of the conductive element corresponds to a preset threshold position within the range of motion. In some aspects, the one or more processors cause the haptic element to generate a first type of haptic feedback when the position of the conductive element reaches the preset threshold position from a first direction, and the one or more processors cause the haptic element to generate a second type of haptic feedback when the position of the conductive element reaches the preset threshold position from a second direction opposite the first direction. The haptic element (e.g., LRA, piezo) can generate a haptic feedback and couples the haptic feedback to a user accessible portion of the computer mouse (e.g., keyplate, housing). In some aspects, the one or more processors can be configured to control the haptic element to generate a second haptic feedback when the sensor detects that the position of the conductive element corresponds to a second preset threshold position within the range of motion different than the first present threshold position. Multiple thresholds are possible including different amplitudes, frequency, type (e.g., linear, tactile, etc.). Variable thresholds can be used to support fast activation functionality, as would be appreciated by one of ordinary skill in the art with the benefit of this disclosure. It is assumed that no switch (i.e., microswitch) is utilized in the various embodiments of the computer mice described herein.

Inductive Coil Design for External Signal Rejection

In some computer peripheral device that employ magnetic sensing, the sensor can include one or more sensing elements comprised of an inductive coil, controlled by a processor, which is operable to generate a first magnetic field in response to an induced current. A target, in response to being subject to the first magnetic field, generates a second magnetic field (e.g., due to eddy currents induced by the first magnetic field) that opposes the first magnetic field in polarity that may be directed back to the inductive coil. This second magnetic field interacts with the first, which can vary a measured inductance of the inductive coil. The processor can generate a position measurement, at least in part, by detecting an inductance of the inductive coil, where the inductance of the inductive coil can change based on an amount of the second magnetic field received by the sensing element. That is, the measured inductance of the coil can vary based on how close the sensing element (the inductive coil) is to the target. In a computer mouse, for instance, when the keyplate is pressed and the sensor gets closer to the target, more eddy currents are induced in the target, a stronger second magnetic field is generated, and thusly the measured inductance of the inductive coil is decreased, which can be calibrated to accurately determine a corresponding position measurement of the keyplate. In a similar manner, when the keyplate is released and the sensor gets farther from the target, fewer eddy currents are induced in the target, a weaker second magnetic field is generated, and thusly the measured inductance of the inductive coil is increased, which again can be used to determine a corresponding position measurement of the keyplate.

In contemporary designs, inductive sensors are known to be resilient to most external/environmental perturbations, but more recently it is becoming more common to charge battery powered devices (e.g., including computer mice) on a wireless charging station (e.g., Qi chargers, Powerplay® mat, and the like), also known as inductive chargers. These types of chargers emit a strong varying magnetic field in order to induce current inside of the battery powered device under charge, and any inductive sensor (e.g., an inductive coil) in the vicinity of such a magnetic field will be affected and will return altered data. That is, an expected signal may be corrupted by the external magnetic field.

Figures 9A, 9B:
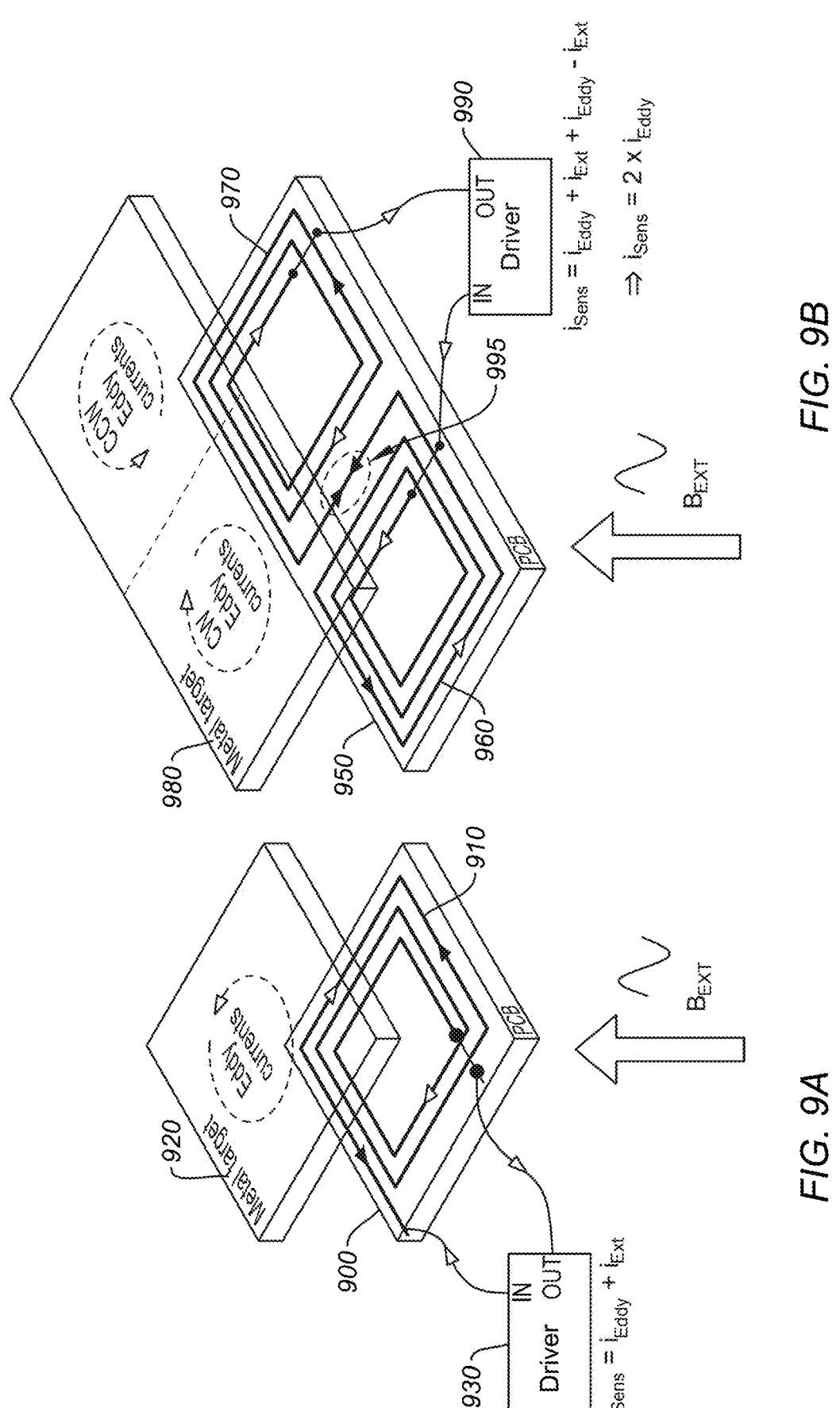
FIG. 9A shows simplified representation of a sensor configured to detect a target in a computer peripheral device.
FIG. 9B shows sensor configured to detect a target in a computer peripheral device (e.g., computer mouse), according to certain embodiments.

FIG. 9A shows simplified representation of a sensor configured to detect a target in a computer peripheral device (e.g., computer mouse). The sensor includes a substrate (e.g., printed circuit board (PCB)) 900, a coil 910 comprised of a conductive material (e.g., copper, aluminum, etc.), a conductive target 920, and driver circuit 930. Driver circuit 930 drives coil 910 with a current, causing a magnetic field that induces eddy currents in target 920. Target 920 generates a second magnetic field of an opposite polarity caused by the eddy currents, thereby inducing eddy currents back the coil 910. Additionally, an external varying magnetic field ($B_{ext}$) induces a current in coil 910, and the resulting sensed signal includes the current caused by the in-system currents (e.g., driving current and eddy currents in coil 910) and externally-caused currents caused by $B_{ext}$. As such, sensor measurements (e.g., position, velocity, acceleration) can be corrupted due to the external magnetic field.

A technical solution to the technical problem of sensor measurement corruption due to varying external magnetic fields includes a novel coil design comprised of one clockwise oriented coil and one counterclockwise oriented coil electrically coupled in together in series that can "self-suppress" the deleterious currents caused by externally induced perturbations.

FIG. 9B shows sensor configured to detect a target in a computer peripheral device (e.g., computer mouse), according to certain embodiments. The sensor includes a substrate (e.g., printed circuit board (PCB)) 950, a first coil 960 comprised of a conductive material (e.g., copper, aluminum, etc.) and configured in a counter-clockwise (CCW) arrangement, a second coil 970 comprised of a conductive material and configured in a clockwise (CW) arrangement, a conductive target 980, and a driver circuit 990. Driver circuit 990 drives first coil 960 and second coil 970 with a current, causing a magnetic field that induces clockwise eddy currents and counter-clockwise eddy currents in target 920, respectively. Target 920 generates second corresponding magnetic fields of an opposite polarity caused by the eddy currents, thereby inducing eddy currents back in first coil 960 and second coil 970. The first and second coils 960, 970 are coupled together in series and connect at point 995. Typically, the coils may be close enough to each other such that they are affected by the same external magnetic field to support good common-mode rejection. The field generated by the coils may be mostly canceled out above the targets, though there may be a field generated below the coils. Note that the first and second coils 960, 970 are arranged with opposite winding so a current difference between coils 960, 970 measured by driver 990 is additive. External varying magnetic field ($B_{ext}$) induces a same current in both coils 960, 970, and a current difference of $i_{ext}$ between coils 960, 970 measured by driver 990 is subtractive. Thus, the external magnetic field is significantly mitigated (e.g., typically greater than 90%) and the resultant sensor measurement is substantially comprised of only the eddy currents with little to no appreciable deleterious influence from the external magnetic field, which leads to more accurate sensor measurement readings. This can be functionally compared, in a sense, to "noise cancelling" in audio devices where external ambient noise is mitigated by reducing it from a total audio signal delivered to a user. For some context with computer mice, in some embodiments, the sensor (e.g., coil) to target distance may be 0.8 mm when the keyplate is fully released (e.g., not pressed) and approximately 0.2 mm when fully pressed. In typical use, a charging device (e.g., PowerPlay charging mat) may be approximately 10 mm from the sensor with varying angles between the sensor and charging device (e.g., 15°-20°). Other ranges are possible that may have longer or shorter ranges, distances, and angles, which would change performance characteristics, as would be appreciated by one of ordinary skill in the art with the benefit of this disclosure.

Another significant advantage of the proposed "noise-canceling" implementations presented herein is that only the coil design has to be modified and no extra components are required for it to work properly. The "canceling" happens passively within in the coil itself, making the system "plug-n-play" with standard inductive sensing drivers.

Figure 10A:
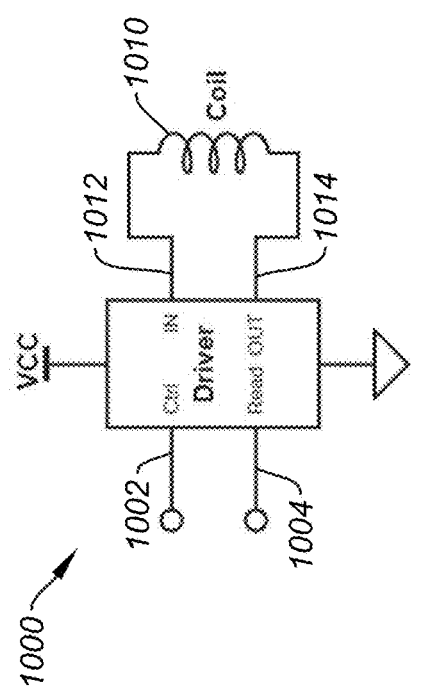
FIG. 10A shows a simplified circuit diagram of a single sensor system.

FIG. 10A shows a simplified circuit diagram of a single sensor system. The driver circuit 1000 is coupled to coil 1010 via IN pin 1012 and OUT pin 1014, and further includes CTRL pin 1002 and READ pin 1004. Driver circuit 1000 is powered via a power supply (e.g., VCC and gnd). The operation of circuit shown in FIG. 10A may be similar to the simplified circuit shown and described above with respect to FIG. 9A.

Figure 10B:
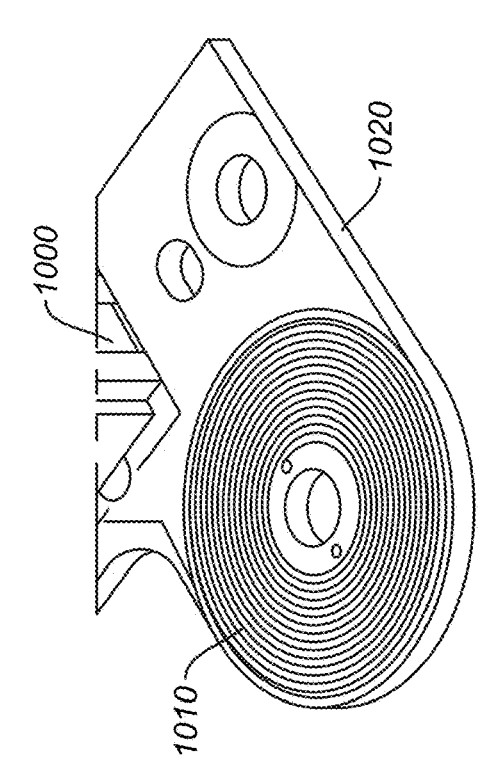
FIG. 10B shows a physical implementation of a single sensor system.

FIG. 10B shows a physical implementation of a single sensor system. Driver circuit 1000 is coupled to a substrate 1020 (e.g., PCB). Coil 1010 is integrated with substrate 1020. A target may be configured relative to coil 1010 for operation as described above at least with respect to FIG. 9A.

Figure 11A:
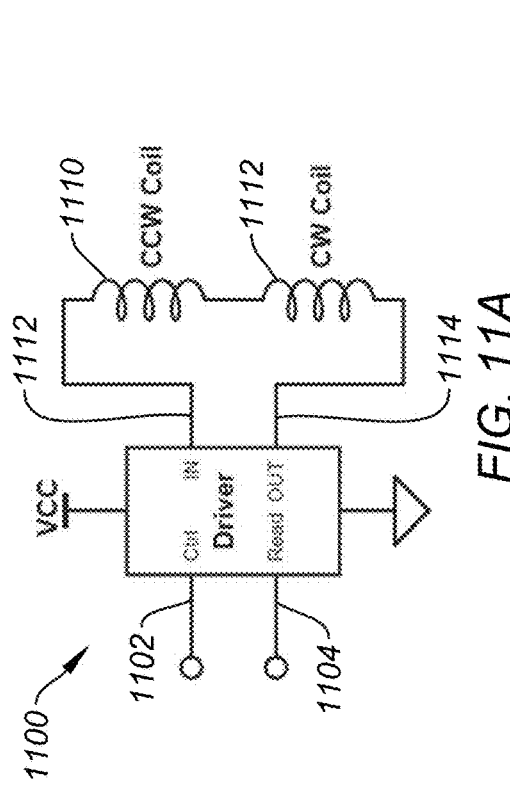
FIG. 11A shows a simplified circuit diagram of a sensor system operable to mitigate deleterious effects of external magnetic fields, according to certain embodiments.

FIG. 11A shows a simplified circuit diagram of a sensor system operable to mitigate deleterious effects of external magnetic fields, according to certain embodiments. The driver circuit 1100 is coupled to a first side of CCW coil 1110 via IN pin 1112. Driver circuit 1100 is coupled a first side of CW coil 1111 via OUT pin 1114. A second side of CCW coil 1110 is coupled to a second side of CW coil 1111, such that coils 1110, 1111 are connected in series. Driver circuit 110 further includes CTRL pin 1102 and READ pin 1104. Driver circuit 1100 is powered via a power supply (e.g., VCC and gnd). The operation of circuit shown in FIG. 11A may be similar to the simplified circuit shown and described above with respect to FIG. 9B.

Figure 11B:
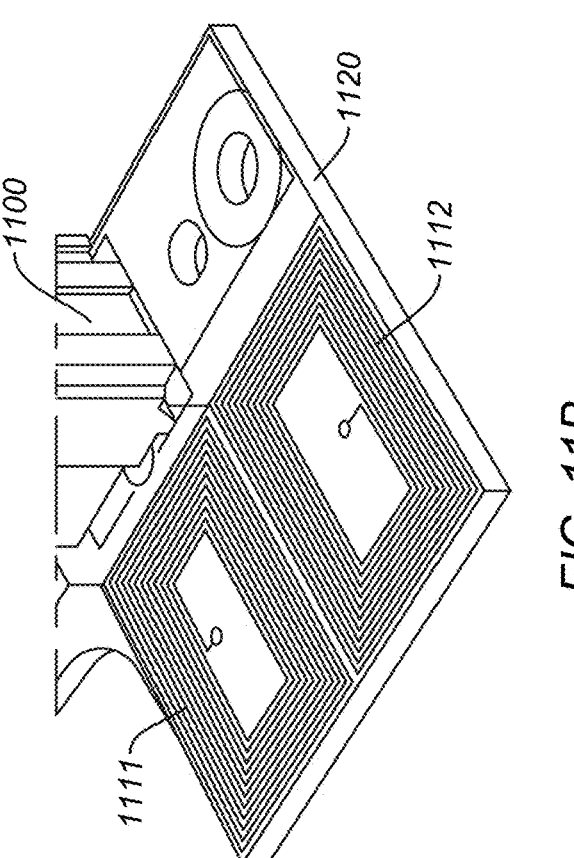
FIG. 11B shows a physical implementation of an inductive coil design for external perturbation rejection, according to certain embodiments.

FIG. 11B shows a physical implementation of an inductive coil design for external perturbation rejection, according to certain embodiments. Driver circuit 1100 is coupled to a substrate 1120 (e.g., PCB). Coils 1110, 1111 are coupled together in series and integrated with substrate 1120. A target may be configured relative to coils 1110, 1111 for operation as described above at least with respect to FIG. 9B. In some aspects, coils 1110, 1111 may be integrated with substrate 1120 or coupled thereto. Coils 1110, 1111 may be modularly coupled to substrate 1120. In some cases, coils 1110, 1111 may be configured on a monolithic substrate or on separate substrates, while remaining series connected. The coils can have a different shape, dimension, and/or location on the substrate(s). One of ordinary skill in the art with the benefit of this disclosure would appreciate the many modifications, variations, and alternative embodiments thereof.

Figure 12A:
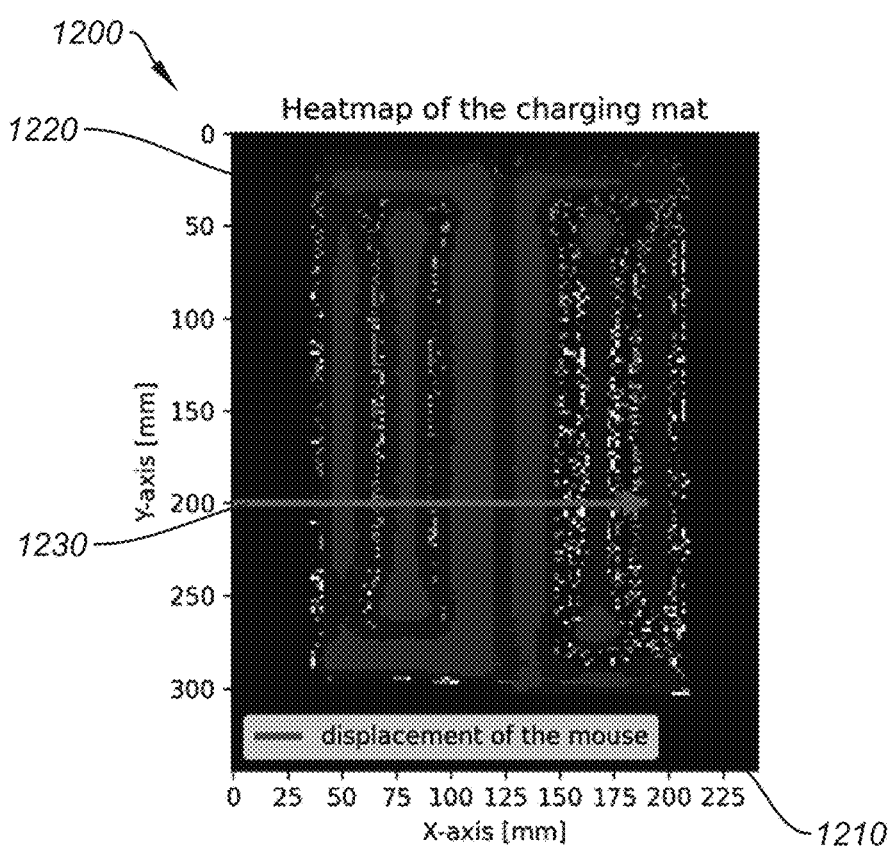
FIG. 12A shows a heatmap for a charging mat configured to charge a computer peripheral device.

FIG. 12A shows a heatmap 1200 for a charging mat configured to charge a computer peripheral device. Heatmap 1200 helps illustrate how a computer mouse may be subject to a varying external magnetic field, as described above. Heatmap 1200 plots a displacement of a computer mouse 1230 over an x-axis 1210 and y-axis 1220 of a charging mat, which can include similar dimensions. As a computer mouse is moved from a first location (0 mm, 200 mm) to a second location (200 mm, 200 mm), it is subject to a real-time changing magnetic field intensity that can deleteriously impact sensor readings in single sensor embodiments, as shown in FIGS. 9A and 10A-10B. Dual coil designs, as shown for instance in FIGS. 9B and 11A-11B, can mitigate the effect of such varying external magnetic fields as described above.

Figure 12B:
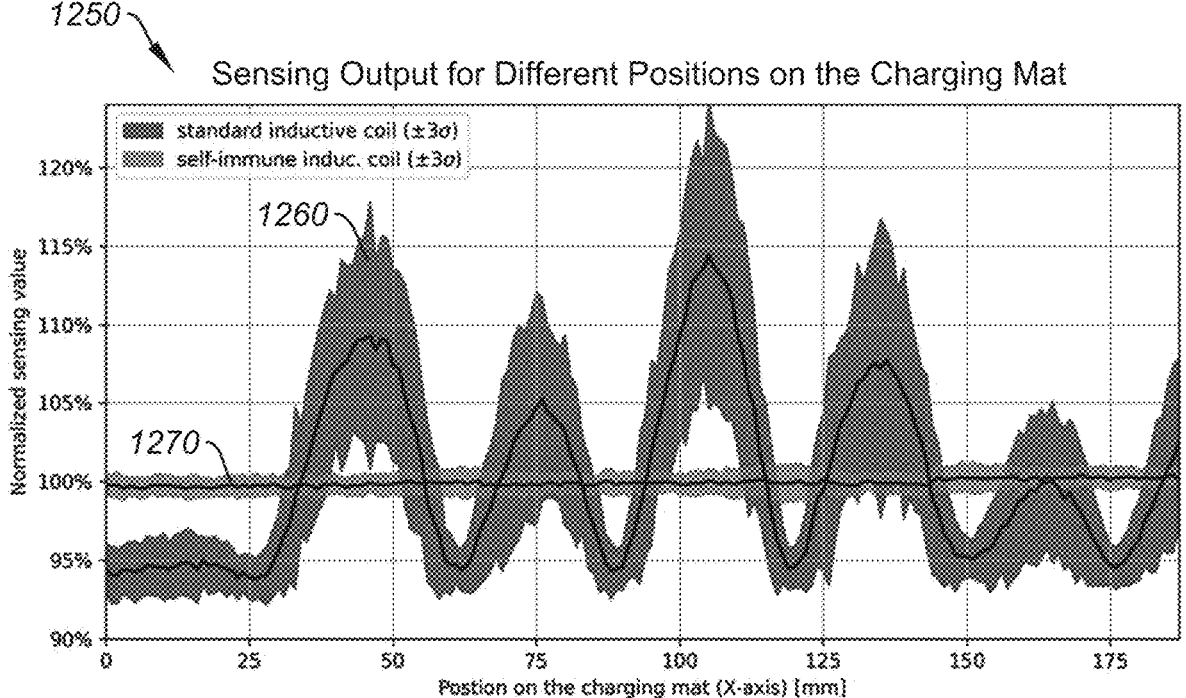
FIG. 12B is a graph showing a sensing output for different positions of a computer mouse on a charging mat for single sensor and dual sensor systems.

FIG. 12B is a graph 1250 showing a sensing output for different positions of a computer mouse on a charging mat for single sensor and dual sensor systems. Graph 1250 plots a normalized sensing value versus a position of the computer mouse on the charging mat. A value of 100% corresponds to accurate measurement and sensing values, and sensing values above and below 100% represent inaccurate measurement values that manifest as noise caused by the external magnetic field of the charging mat. The plot 1260 for a single inductive coil system, as shown in FIGS. 9A and 10A-10B, shows that the normalized sensing value deviates at local peaks approximately corresponding to 47 mm (109%), 62 mm (95%), 76 mm (105%), 87 mm (94%), 105 mm (114%), 121 mm (94%), 135 mm (107%), 150 mm (95%), and 175 mm (95%), with smaller deviations in between. Referring back to FIG. 12A, the peaks tend to correspond to the significant variations in the external magnetic field intensity of the charging mat. Thus, graph 1250 aptly shows how a single inductor designs that are subject to relatively strong external magnetic fields, like charging mats, can be subject to significant deleterious effects that can materially affect the accuracy of corresponding sensor measurements. In contrast, dual sensor systems, like those described above with respect to FIGS. 9B and 11A-11B, can materially mitigate deleterious effects of external magnetic fields on sensor measurements due to the noise-cancelling properties of the series connected coils 1110, 1112. Referring to plot 1270, the position of the mouse remains very close to 100% (e.g., within 1%) and the noise is reduced by up to a factor of six, substantially improving the fidelity of the sensor measurements.

In certain embodiments, a switchless computer mouse may include a novel architectural configuration of sensors that can reduce interference by ambient magnetic fields that can otherwise affect the ability to detect a position (and/or velocity, acceleration, jerk) of a keyplate. Such embodiments can comprise: a keyplate, a first conductive element (e.g., a target) coupled to the keyplate, a second conductive element coupled to the keyplate, a first sensor element (e.g., an inductive coil) configured to detect a first magnetic field generated by the first conductive element and generate first sensor data, a second sensor element configured to detect a second magnetic field generated by the second conductive element and generate second sensor data, and one or more processors configured to: determine a position of the keyplate based on the first sensor data, mitigate interference by a third ambient magnetic field via common mode rejection based on a difference value of the first sensor data and the second sensor data. In some implementations, the first and second sensor elements can be coupled together in a common-mode configuration and the first and second sensors can be configured on a same monolithic substrate (see, e.g., FIG. 9B and FIG. 11B) although other implementations are possible, as would be appreciated by one of ordinary skill in the art with the benefit of this disclosure.

FIG. 12C is a simplified flow chart showing aspects of a method 1280 for mitigating deleterious effects of external magnetic fields in a computer peripheral device (e.g., computer mouse), according to certain embodiments. Method 1280 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1280 can be performed by aspects of system 200, system 300, or a combination thereof.

At operation 1281, method 1280 can include driving an electrical current through a first sensor element and a second sensor element, according to certain embodiments.

At operation 1282, method 1280 can include generating a first magnetic field by the first sensor element in response to being driven by the electrical current, according to certain embodiments.

At operation 1283, method 1280 can include generating a second magnetic field by the second sensor element in response to being driven by the electrical current, according to certain embodiments.

At operation 1284, method 1280 can include inducing first electrical eddy currents in a first conductive element coupled to a keyplate of the computer mouse, the induced first electrical eddy currents caused by a first magnetic field, according to certain embodiments.

At operation 1285, method 1280 can include inducing second electrical eddy currents in a second conductive element coupled to a keyplate of the computer mouse, the induced second electrical eddy currents caused by a second magnetic field, according to certain embodiments.

At operation 1286, method 1280 can include generating a third magnetic field by the first conductive element in response to the first electrical eddy currents, according to certain embodiments.

At operation 1287, method 1280 can include generating a fourth magnetic field by the second conductive element in response to the second electrical eddy currents, according to certain embodiments.

At operation 1288, method 1280 can include detecting the third magnetic field by the first sensor element and generating corresponding first sensor data, according to certain embodiments.

At operation 1289, method 1280 can include detecting the fourth magnetic field by the second sensor element and generating corresponding second sensor data, according to certain embodiments.

At operation 1290, method 1280 can include determining a position of the keyplate based on the first or second sensor data, according to certain embodiments.

At operation 1291, method 1280 can include reducing interference caused by an external magnetic field via common mode rejection based on a difference value of the first sensor data and the second sensor data, according to certain embodiments. In some embodiments, the first sensor element is an inductive coil wound in a clockwise direction, and the second sensor element is an inductive coil wound in a counter-clockwise direction. In some cases, the first magnetic field is of a first polarity, and the second magnetic field is of a second polarity opposite the first polarity. In certain embodiments, the first conductive element and the second conductive element are electrically coupled together. The first and second conductive elements can be physically coupled together as a monolithic structure or they may be separate. The first sensor element and the second sensor element can be comprised of a single, common conductive element connected in series.

It should be appreciated that the specific steps illustrated in FIG. 12C provide a particular method 1280 for mitigating deleterious effects of external magnetic fields in a computer peripheral device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Fast Activation Detection

Fast activation functionality can be described as a detected press and release of a keyplate, typically beyond a threshold position, even if the press and release occurs mid-throw over a small portion of the total plunger range of motion without recrossing the threshold position. In other words, fast activation can instantly activate a key press (make contact) at a threshold position and instantly deactivate the key press (break contact) at the onset of the release, regardless of where that occurs whether at the threshold position or past the threshold position. Fast activation can eliminate all or nearly all latency caused by physical movement of the key (e.g., keyplate) by dynamically activating and deactivating the key based on factors (e.g., position, speed, acceleration) other than of a fixed point in the key travel. This also means you can repeat a key press mid motion without needing to surpass a fixed reset or actuation point for rapid presses. Fast activation to be as sensitive as 0.1 mm or less. Thus, a user could push a keyplate past a "make" threshold and repeatedly release and press along the range of motion past the threshold point and over a small range of motion (+/−0.1 mm) and rapidly effectuate make and break events without having to completely release the keyplate past the threshold to effectuate another make event. Fast activation can be referred to under other names, such as "fast trigger," "rapid activation," "rapid trigger," "quick trigger," "fast actuation," "rapid actuation," and the like.

At a high level, fast activation can be defined as an up and down movement of the keyplate, where the movement can be detected by a position threshold, speed threshold, acceleration threshold, jerk threshold, or combination thereof. In some embodiments, speed can be measured by dividing the travel between a measurement and dividing it by the time (e.g., the derivative of position). Typically, a few sensor measurements are collected before calculating a speed, which adds delay (latency). However, the tradeoff of added latency is an ability to detect a click faster. For instance, instant speed can be computed with as little as two measurements, which introduces very little delay. Speed measurements can show user intent (as can acceleration and/or jerk) more so than position, as position may introduce false positives, as further described below.

There are different advantages to using the different detecting schemas. For instance, when using position as a threshold, make and break (key press and release) is not materially influenced by the speed of the key press or released. Slow key presses/releases can track as accurately as fast presses/releases. However, position-only fast activation detection may be subject to higher rates of accidental clicks (false positive) due to the high sensitivity to the movement of the mouse.

Figures 13, 14:
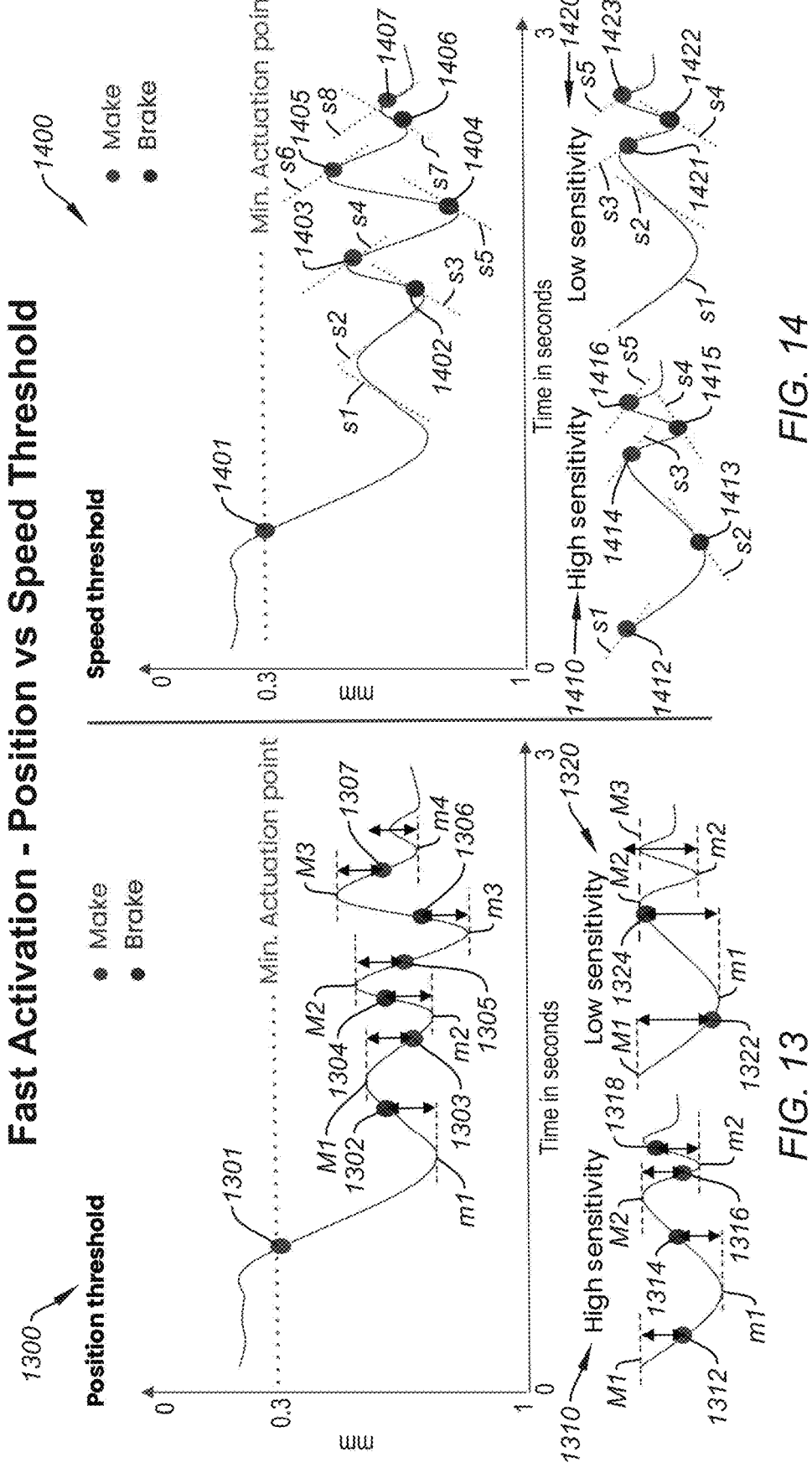
FIG. 13 shows a number of graphs showing make/break points for a keyplate operating over a range of motion and using fast activation functionality based on a position trigger threshold, according to certain embodiments.
FIG. 14 shows a number of graphs showing make/break points for a keyplate operating over a range of motion and using fast activation functionality based on a speed threshold, according to certain embodiments.

FIG. 13 shows a number of graphs showing make/break points for a keyplate operating over a range of motion and using fast activation functionality based on a position trigger threshold (also referred to herein as a position sensitivity threshold), according to certain embodiments. In some embodiments, a position of the keyplate (e.g., a tracked target as described above) is tracked and a make or break connection can be made when the keyplate switches direction (e.g., from press to release) and travels a threshold distance. The key press range of motion is approximately 1 mm and the key press/releases occur over a range of about 3 s. Other ranges of motion, activation points, and time ranges are possible, as would be appreciated by one of ordinary skill in the art with the benefit of this disclosure.

Referring to graph 1300, a user begins pressing the keyplate and at point 1301 (the minimum actuation point) a key press is detected (a "make" command). The keyplate reaches a first local minima m1, the user begins releasing the keyplate, and the keyplate begins to travel back up. A threshold change in position between first local minima m1 and position 1302 is reached and a key release is detected (a "break" command is made). By way of example, as shown, a "step" is 0.03 mm, but could be in the range 0.01 mm-0.05 mm or other suitable range. In the example shown, the position threshold is about 3 steps, so 0.09 mm. If the first local minima (m1) is 0.25 mm, then position 1302 is 0.34 mm.

The keyplate then reaches a first local maxima M1, and the user begins pressing the keyplate back down. A threshold change in position between the first local maxima M1 and position 1303 is reached (meeting or exceeding the position trigger threshold), and a make command is again made. The keyplate continues a second local minima m2, and the user begins releasing the keyplate, causing the keyplate to move back up. A threshold change in position between the second local minima m2 and position 1304 is reached, and a break signal is made. The keyplate then reaches a second local maxima M2, and the user begins pressing the keyplate back down. A threshold change in position between the second local maxima M2 and position 1305 is reached, and a make signal is made. The keyplate proceeds to a third local minima m3, and the user begins releasing the keyplate, causing the keyplate to move back up. A threshold change in position between the third local minima m3 and position 1306 is reached, and a break signal is made. The keyplate then reaches a third local maxima M3, and the user begins pressing the keyplate back down. A threshold change in position between the second local maxima M3 and position 1307 is reached, and a make signal is made. The keyplate continues to a fourth local minima m4, and the user begins releasing the keyplate, causing the keyplate to move back up. The keyplate then reaches another local maximum before reaching the threshold change in position. As such, no make or break command is generated. Note that each of the make/break commands occur below the minimum actuation point 1301. In some embodiments, keyplate direction changes and position threshold changes that occur above the minimum actuation point will not instantiate a keypress. Such keypresses are typically not associated with intentional key presses, although the minimum actuation point can be set to any suitable distance or may be excluded entirely, as would be appreciated by one of ordinary skill in the art with the benefit of this disclosure.

Graphs 1310 and 1320 illustrate how different sensitivity settings can affect the instantiation of make/break commands over a same keyplate movement pattern. Graph 1310 shows a high sensitivity setting for a position-based fast activation keyplate system. For example, instead of the position threshold shown in graph 1300, a smaller position threshold change can be applied, where smaller changes in direction can instantiate a make/break command, such that a user can press/release a keyplate with finer articulation (e.g., smaller movements) for high sensitivity fast activation control. Referring back to graph 1310, the keyplate is depressed from a local maxima M1 (assuming the keyplate is below a minimum actuation point) until a threshold change in position between the first local maxima M1 and position 1312 is reached, causing a make command to be instantiated. The keyplate continues a first local minima m1, and the user begins releasing the keyplate, causing the keyplate to move back up. A threshold change in position between the first local minima m1 and position 1314 is reached, and a break signal is made. The keyplate then reaches a second local maxima M2, and the user begins pressing the keyplate back down. A threshold change in position between the second local maxima M2 and position 1316 is reached, and a make signal is made. Finally, the keyplate continues a second local minima m2, and the user begins releasing the keyplate, causing the keyplate to move back up. A threshold change in position between the second local minima m1 and position 1318 is reached, and a break signal is made.

Graph 1320 shows a low sensitivity setting for a position-based fast activation keyplate system. For example, instead of a position trigger threshold change as shown in graph 1300, a larger position trigger threshold change can be applied, where larger changes in direction will instantiate a make/break command, such that a user has to press/release a keyplate with larger articulations (e.g., larger movements) for a lower sensitivity fast activation control. Referring back to graph 1320, the keyplate is depressed from a local maxima M1 (assuming the keyplate is below a minimum actuation point) until a threshold change in position between the first local maxima M1 and position 1322 is reached, causing a make command to be instantiated. Note that the amount of movement required to instantiate a keypress is markedly greater as compared to the higher sensitivity fast activation setting of graph 1310. The keyplate continues a first local minima m1, and the user begins releasing the keyplate, causing the keyplate to move back up. A threshold change in position between the first local minima m1 and position 1324 is reached, and a break signal is made. The keyplate then reaches a second local maxima M2, and the user begins pressing the keyplate back down until a second local minima is reached. Note that the distance between the second local minima and the next local maxima is less than the threshold change in position, thus no make/break command is instantiated. The keyplate proceeds to the second local maxima M3, and the user begins pressing the keyplate back down. Again, the distance between second local minima m2 and second local maxima M3 is less than the threshold change in position, thus no make/break command is instantiated. Thus, using the same keypress travel path, a higher position sensitivity setting may produce four make/break commands, while a lower position sensitivity setting over the same travel path may only produce two make/break commands. Any suitable position sensitivity can be applied, including dynamic position sensitivity settings that can be modulated based on keyplate speed, acceleration, jerk, or other metric, as would be appreciated by one of ordinary skill in the art with the benefit of this disclosure, and as further described below.

FIG. 14 shows a number of graphs showing make/break points for a keyplate operating over a range of motion and using fast activation functionality based on a speed threshold, according to certain embodiments. In some embodiments, a position of the keyplate is tracked and a make or break connection can be made when the keyplate reaches a speed threshold in either a descending (e.g., keypress) or ascending (e.g., key release) direction.

Referring to graph 1400, a user begins pressing the keyplate and at point 1401 (the minimum actuation point) a key press is detected (a "make" command). As the user presses and releases the keyplate below the minimum actuation point, a fast activation function is provided and based on whether the keyplate reaches or exceeds a speed threshold. The speed threshold is represented by a slope (e.g., s1-s8) that corresponds to a derivative of position; that is, a change in movement over a change in time. When an absolute value of the speed threshold is reached in the negative direction (e.g., during a key press event), a make command is instantiated. Conversely, when the speed threshold is reached in the positive direction (e.g., during a key release event), a break command is instantiated.

Referring back to graph 1400, after the make command at 1401, the keyplate continues to be pressed until a first local minima is reached and the keyplate begins moving back up. The speed that the keyplate reaches, as defined by s1, does not reach the speed threshold, and thus a break command is not instantiated. The keyplate continues to a local maxima and moves back down to a local minima at a speed defined by s2, which does not meet the speed threshold. The initial make command is still held. The keyplate continues to a local minima and moves back up to a next local maxima at a speed defined by s3, which meets or exceeds the speed threshold, thereby causing a break command at 1402. The keyplate continues to a local maxima and moves back down to a next local minima at a speed defined by s4, which meets or exceeds the speed threshold, thereby causing a new make command 1403. The keyplate proceeds to a local minima and moves back upwards to a next local maxima at a speed defined by s5, which meets or exceeds the speed threshold, thereby causing a new break command 1404. The keyplate changes direction at a local maxima and moves back down to a next local minima at a speed defined by s6, which meets or exceeds the speed threshold, thereby causing a new make command 1405. The keyplate descends to a next local minima and moves back upwards to a next local maxima at a speed defined by s7, which meets or exceeds the speed threshold, thereby causing a new break command 1406. Finally, the keyplate proceeds to a local minima and moves back upwards at a speed defined by s8, which meets or exceeds the speed threshold, thereby causing a new make command 1407. Similar to the position threshold examples described above, each of the make/break commands occur below the minimum actuation point 1401. In some embodiments, keyplate movement beyond the speed threshold that occurs above the minimum actuation point will not instantiate a keypress. Such keypresses are typically not associated with intentional key presses, although the minimum actuation point can be set to any suitable distance or may be excluded entirely, as would be appreciated by one of ordinary skill in the art with the benefit of this disclosure.

Graphs 1410 and 1420 illustrate how different speed sensitivity settings can affect the instantiation of make/break commands over a same keyplate movement pattern. Graph 1410 shows a high sensitivity setting for a speed-based fast activation keyplate system. For example, instead of a speed threshold change, as shown in graph 1400, a higher sensitivity speed threshold change can be applied where lower keyplate speeds can instantiate a make/break command. By way of example, 20 steps may correspond to 0.7 mm of keyplate travel, although other ranges are possible as would be appreciated by one of ordinary skill in the art with the benefit of this disclosure.

Referring back to graph 1410, the keyplate is depressed (below a minimum actuation point) at a speed (also referred to as a "rate") defined by s1. The speed threshold can be relatively low, as described above, so key presses and releases are more likely to trigger a make or break command. Speed s1 meets or exceeds the speed threshold, and a make command 1412 is instantiated. The keyplate reaches a local minima and begins moving back upwards as the user releases the keyplate. The keyplate ascends at a speed s2 that meets or exceeds the speed threshold, and a break command 1413 is instantiated. The keyplate reaches a local maxima and again moves back downwards as the user presses the keyplate. The key descends at a speed s3 that meets or exceeds the speed threshold, and another make command 1414 is instantiated. Next, the keyplate reaches a local minima and moves back upwards as the user releases the keyplate. The key ascends at a speed s4 that meets or exceeds the speed threshold, and break command 1415 is instantiated. Finally, the keyplate reaches a local maxima and moves back downwards as the user presses the keyplate. The key descends at a speed s5 that meets or exceeds the speed threshold, and a make command 1416 is instantiated. Note that the speed threshold is slow enough (e.g., high sensitivity) such that every up/down action of the keyplate is recognized as a make or break. This can be advantageous in competitive gaming scenarios where higher sensitivity may be more likely to ensure that intended clicks in a fast activation scenario are recognized. A consideration in setting the sensitivity is to balance it such that simply resting one's finger on a keyplate will not inadvertently trigger a make or break command. Calibrating the keyplate operation with position, speed, or any combination of metrics for fast activation functionality would be appreciated by one of ordinary skill in the art with the benefit of this disclosure.

Referring to graph 1420, the keyplate is depressed (below a minimum actuation point) at a speed defined by s1. Here, the speed threshold is relatively high, so inadvertent key presses and releases are less likely to trigger a make or break command. Speed s1 does not meet or exceed the speed threshold, and no make/break command is instantiated. The keyplate reaches a local minima and begins moving back upwards as the user releases the keyplate. The keyplate ascends at a speed s2 that also fails to meet or exceed the speed threshold, and thus no make/break command is instantiated. The keyplate reaches a local maxima and again moves back downwards as the user presses the keyplate. The key descends at a speed s3 that meets or exceeds the speed threshold, and a make command 1421 is instantiated. Next, the keyplate reaches a local minima and moves back upwards as the user releases the keyplate. The key ascends at a speed s4 that meets or exceeds the speed threshold, and break command 1422 is instantiated. Finally, the keyplate reaches a local maxima and moves back downwards as the user presses the keyplate. The key descends at a speed s5 that meets or exceeds the speed threshold, and a make command 1423 is instantiated. Note that the speed threshold is fast enough (e.g., high sensitivity) such that only a few of the keyplate movements are recognized as a make or break command, as compared to the high sensitivity setting where all of the keyplate direction changes were interpreted as key press and releases. Calibrating the keyplate operation with position, speed, or any combination of metrics for fast activation functionality would be appreciated by one of ordinary skill in the art with the benefit of this disclosure.

Figure 15:
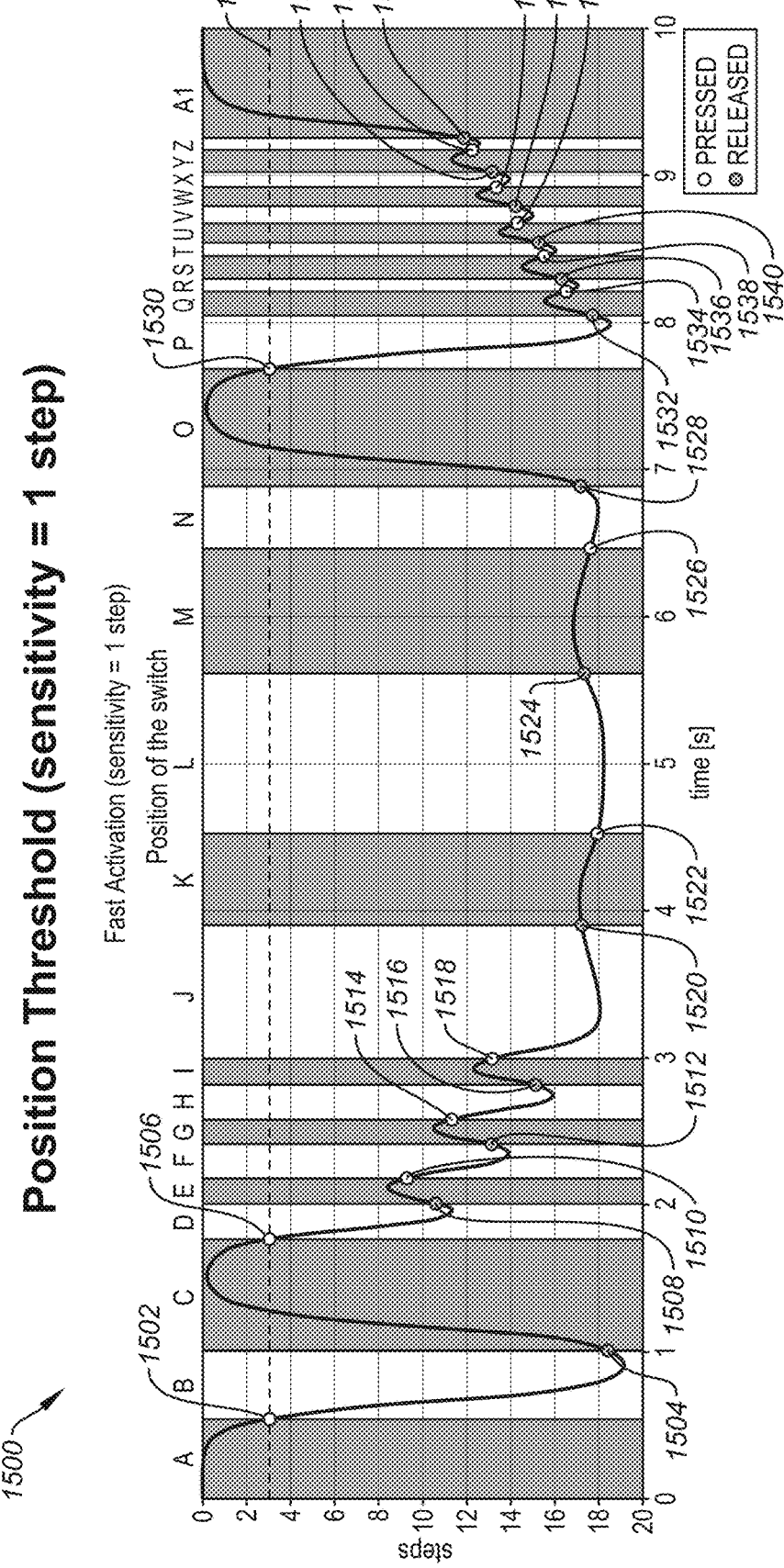
FIG. 15 shows a graph that plots a keypress movement over time for a fast activation system using a position threshold to determine keypress events, according to certain embodiments.

FIG. 15 shows a graph 1500 that plots a keypress movement over time for a fast activation system using a position threshold to determine keypress events, according to certain embodiments. Graph 1500 shows a keypress movement over a range of motion defined in steps. In some embodiments, 20 steps may correspond to 0.7 mm (e.g., full range of motion), where one step may equal 0.035 mm. Other ranges are possible and step sizes are possible. A step can be defined as any suitable distance and may depend on the range of motion of the keyplate or other moving element that the tracked target is coupled to and tracked, as would be appreciated by one of ordinary skill in the art with the benefit of this disclosure. Setting a position threshold sensitivity (i.e., a threshold change in position) to a high sensitivity value may ensure very fast key press (make) or key release (break)

detection, however if too sensitive, some very minute and unintentional keyplate movements may be interpreted as a keypress. For example, moving a computer mouse along certain surfaces may cause minor vibrations. In such cases, those minor vibrations may cause the keyplate (when held below the minimum actuation point) to move one or more steps, which would be detected as a key press when the position threshold is set too high (e.g., 1 step). Graph 1500 illustrates how having too high of a position threshold may result in false positive key presses.

In graph 1500, intervals A-Z define various keyplate movements for a computer peripheral device (e.g., computer mouse). At interval A, a user presses a keyplate until it reaches the minimum actuation point (MAP) 1501, which instantiates a make command 1502. At interval B, the keyplate continues to be pressed down 19 steps to a local minima and begins to be released. At the end of interval B, the keyplate moves up from the local minima by one step and a break command 1504 is instantiated because the position trigger threshold is set to one step. During interval C, the keyplate continues moving up past the minimum actuation point and nearly back to an unpressed state, reaching a local maxima and then moving back down to the minimum actuation point, which instantiates a make command 1506.

Intervals D-I show a series of small throw, fast activation key presses that occur below MAP 1301 over a descending trajectory. These fast activation key presses (make/break commands) are made at different locations along the keyplate range of motion and below MAP 1301, which is made possible due to analog keyplate detection in a switchless computer peripheral device. During interval D, a local minima is reached (approx. 11 steps from an unpressed state) and the keyplate begins moving back up. After moving one step upward (the position trigger threshold), a make command 1508 is instantiated. During intervals E-I, local minimas/maximas are met and opposite movements of greater than one step are reached, thereby causing corresponding make or break commands to be instantiated (1510-1518) similar to D.

During intervals J-N, a user a attempts to maintain the keyplate at a position (e.g., 18 steps from the unpressed state) while moving the computer mouse along a surface. Vibrations caused by the movement cause the keyplate to make small up-and-down movements that meet or exceed the position trigger threshold (e.g., greater than or equal to one step) and are thus detected as inadvertent (false positive) keypress/release events 1520-1526, as shown in FIG. 15.

During intervals O-P, a large throw, intended key release and subsequent keypress are made. After reaching a local minima, the keyplate moves up one step and a break command 1528 is instantiated. The keyplate is released and moves up beyond MAP 1501, followed by a subsequent keypress that passes through MAP 1501 (make command 1530) to a nearly maximum deflection along its range of motion.

Intervals Q-Z show another series of small throw, fast activation key presses that occur below MAP 1301 over an ascending trajectory. During intervals Q-Z, local minimas and maximas are met and opposite movements of greater than one step are reached, thereby causing corresponding make or break commands to be instantiated (1532-1550). A final full keyplate release is made at the beginning of A1, causing break command 1552.

As a result, while a high position trigger threshold (also referred to as a "position sensitivity threshold") will be more likely to detect all intended fast activation key press events, FIG. 15 shows how unintended clicks may occur due to vibrations, impacts, or other externally induced events. In some embodiments, the position trigger threshold can be calibrated to avoid detection of small, unintended keypress movements, while still remaining sensitive enough to capture fine fast activation movements.

Figure 16:
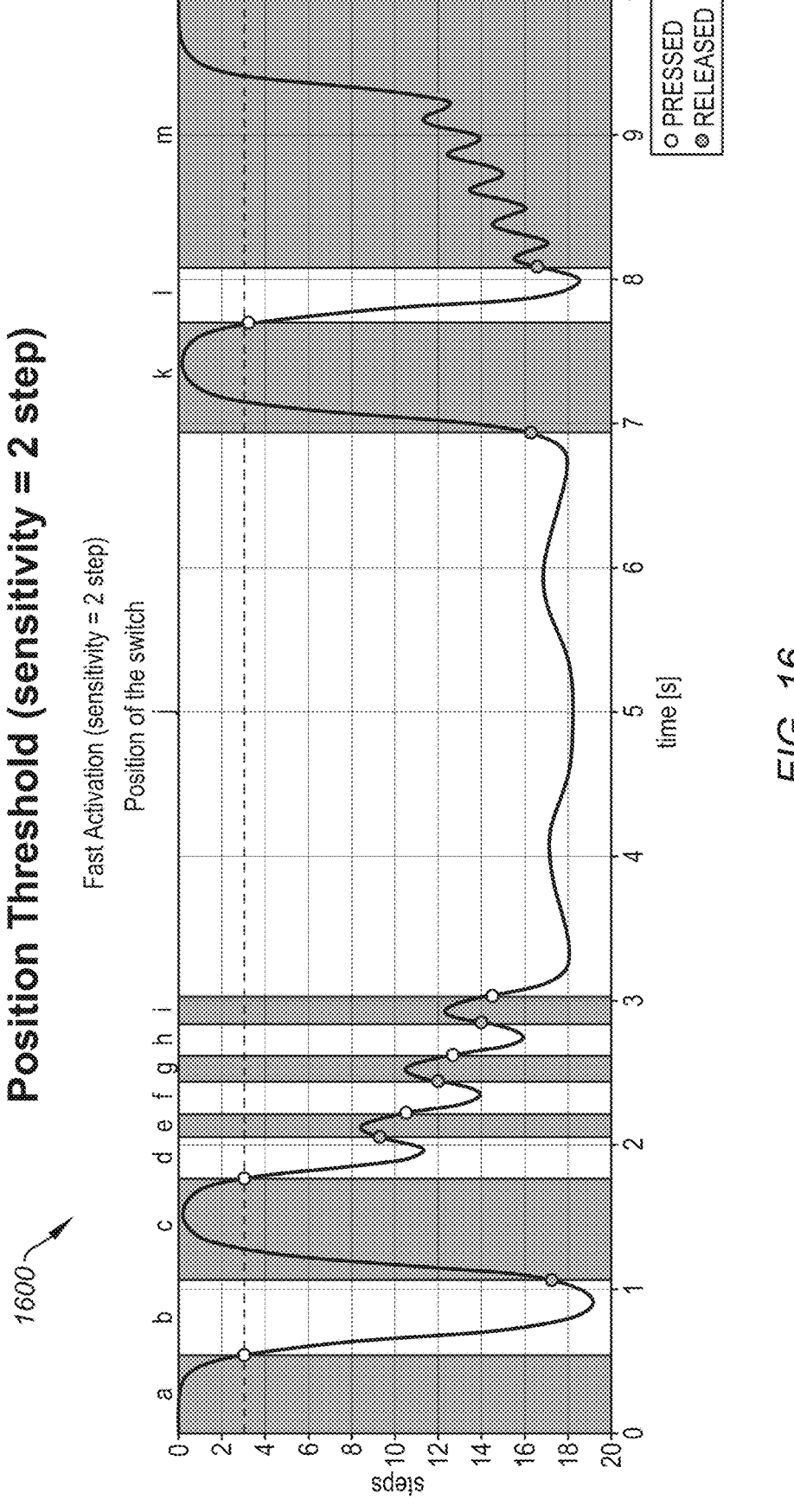
FIG. 16 shows a graph that plots a keypress movement over time for a fast activation system using a position threshold to determine keypress events, according to certain embodiments.

FIG. 16 shows a graph 1600 that plots a keypress movement over time for a fast activation system using a position threshold to determine keypress events, according to certain embodiments. Graph 1600 shows a keypress movement over a range of motion defined in steps, similar to graph 1500, but with a position trigger threshold of two steps instead of one.

Intervals A-I, though subject to a lower trigger threshold (e.g., 2 steps), result in similar make/break command outcomes, but farther along on the curves because two steps from a local minima/maxima are needed to instantiate a keypress/release event, rather than one step, as shown in graphs 1500.

During interval j, the unintended keyplate movements (e.g., due to externally induced vibrations) do not move the keyplate beyond two steps from a any local maxima or minima, and thus no keypress events (e.g., make/break commands) are instantiated. Intervals k and l are similar to that shown in FIG. 15, but with make/break events at two steps away from local minima/maxima.

Intervals m includes the second series of small throw, fast activation key presses that occur below MAP 1301 over an ascending trajectory. Note that the local minimas and maximas are less than two steps and thus none of the fast clicking, small amplitude fast activation movements are detected. Thus, a two-step position trigger threshold may avoid detection of false key press/release events in interval j, the lower sensitivity of a two-step threshold can fail to recognize small, intended fast activation key press events. In some embodiments, other position trigger thresholds can be used to better capture small fast trigger movements and avoid unintended movement. Alternatively or additionally, other metrics can be used to recognize intended make/break commands, including speed, acceleration, and/or jerk, or in some cases, a metric can be modified based on another metric (e.g., position trigger threshold increased or decreased based on a detected speed, acceleration, and/or jerk), as further described below.

Figures 17A, 17B:
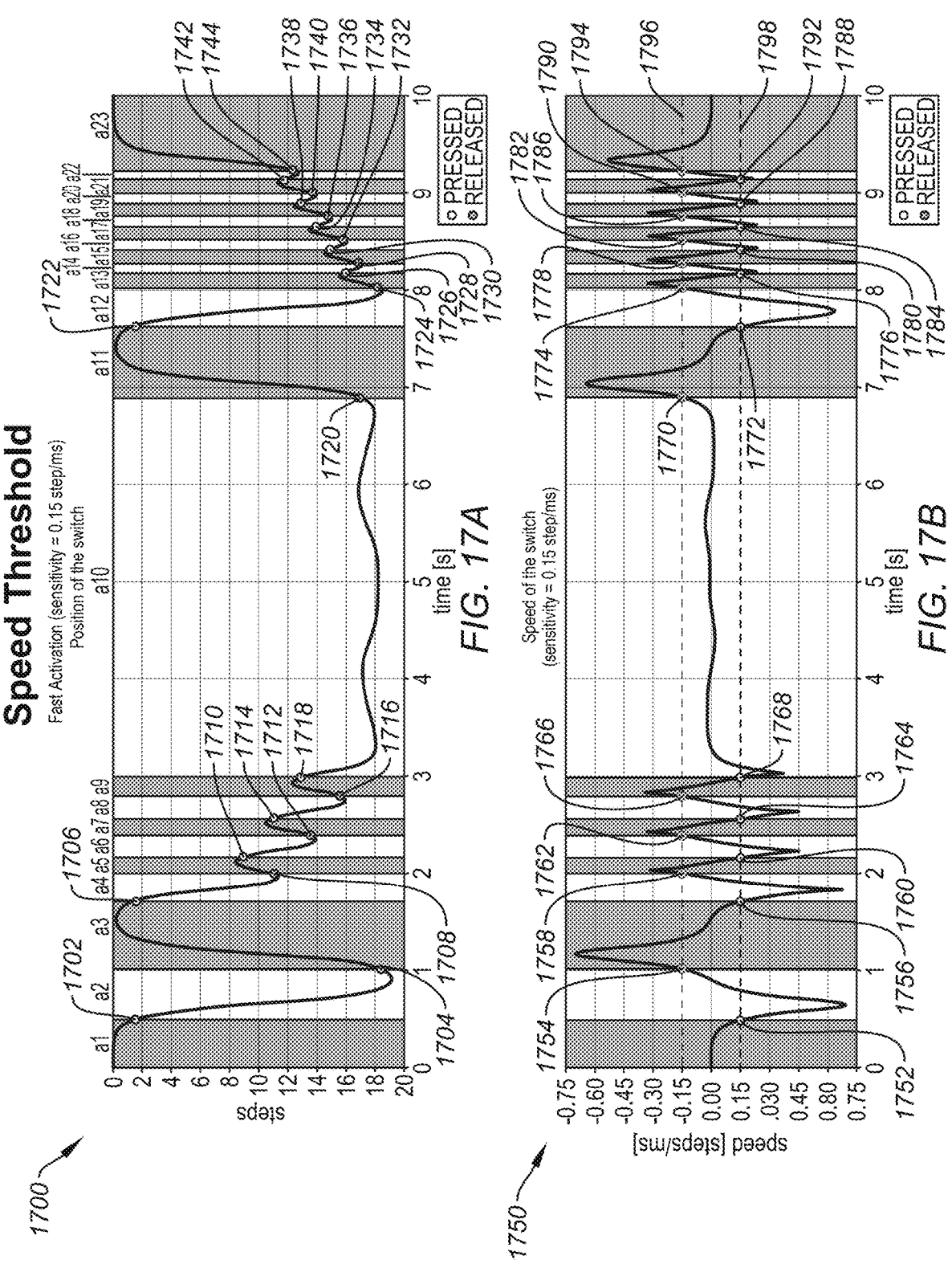
FIGS. 17A-17B shows graphs that plot keypress movement and a corresponding speed over time for a fast activation system, according to certain embodiments.

FIG. 17A shows a graph 1700 that plots a keypress movement over time for a fast activation system, according to certain embodiments. FIG. 17B shows a corresponding graph 1750 showing keypress speed over time that is used to determine when keypress events are detected for the keypress movement of graph 1700, according to certain embodiments. A keypress (e.g., make command) is determined when the keyplate press speed meets or exceeds a speed trigger threshold 1770 of 0.15 steps/ms (also referred to as a "speed sensitivity threshold" or "velocity trigger threshold"). A key release (e.g., break command) is determined when the keyplate release speed meets or exceeds a speed trigger threshold 1760 of –0.15 steps/ms. The speed trigger threshold can be set to any suitable speed, can be symmetrical or non-symmetrical (e.g., different trigger threshold for key presses versus key releases) and can vary based on a current position of the keyplate (e.g., different keyplate positions may have different corresponding speed trigger thresholds). In some embodiments, a speed trigger threshold range can be 1 mm/s-30 mm/s, or other suitable range. Since one step=0.035 mm, 0.15 steps/ms can correspond to 0.0052545 mm/ms or 5.254.5 mm/s. Any other speed trigger threshold or step can be used and are provided here only for context and not to limit the scope of possible embodiments. One of ordinary skill in the art with the benefit of this disclosure would appreciate the many modifications, variations, and alternative embodiments thereof.

FIGS. 17A and 17B illustrate how, in some cases, a speed trigger threshold can detect fast activation events more accurately than position-based detection, according to certain embodiments. At interval a1, the keyplate is depressed from a non-pressed state. When the keyplate speed reaches 0.15 steps/ms, a first keypress 1702 (make command) is instantiated. At interval a2, the keyplate is pressed down 19 steps to a local minima and begins to be released. The release speed (referencing graph 17B) reaches –0.15 steps/ms at point 1704 and a key release (break command) is instantiated. During interval a3, the keyplate moves up to a local maxima and begins moving back down again, reaching 0.15 steps/ms at point 1706 where a make command is instantiated.

Intervals a4-a9 show a series of small throw, fast activation key presses that occur over a descending trajectory, in a same pattern as described above with respect to FIGS. 15-16. Each successive click and release over a4-a9 meets or exceeds 0.15 steps/ms and thus each fast activation event 1708-1718 is accurately detected.

Interval a10 includes unintended keyplate movements (e.g., due to externally induced vibrations). The maximum keyplate speed achieved over interval a10 does not exceed more than +/–0.05 steps/ms. As such, the unintended keyplate movements do not cause any make/break events. Intervals a11 and a12 are similar to that described above with respect to a3.

Intervals a13-a22 include the second series of small throw, fast activation key presses that begin near the bottom of the keyplate range of motion (e.g., about 18 steps from an unpressed state) and continue over an ascending trajectory. The speed of each key press and release meet or exceed the 10.0151 steps/ms speed trigger threshold, and each key press and key release is accurately detected. Thus, using a speed trigger threshold to detect key press events in a fast activation-based system may provide more accurate key press detection as intentional key movement may tend to have substantially more keyplate speed than unintentional keyplate movements and can more easily be set to filter key press movements with greater headroom (e.g., greater delta in speed between intentional and unintentional keyplate movement) than movements measured by position changes, as described above with respect to FIGS. 15-16.

Figures 18, 19:
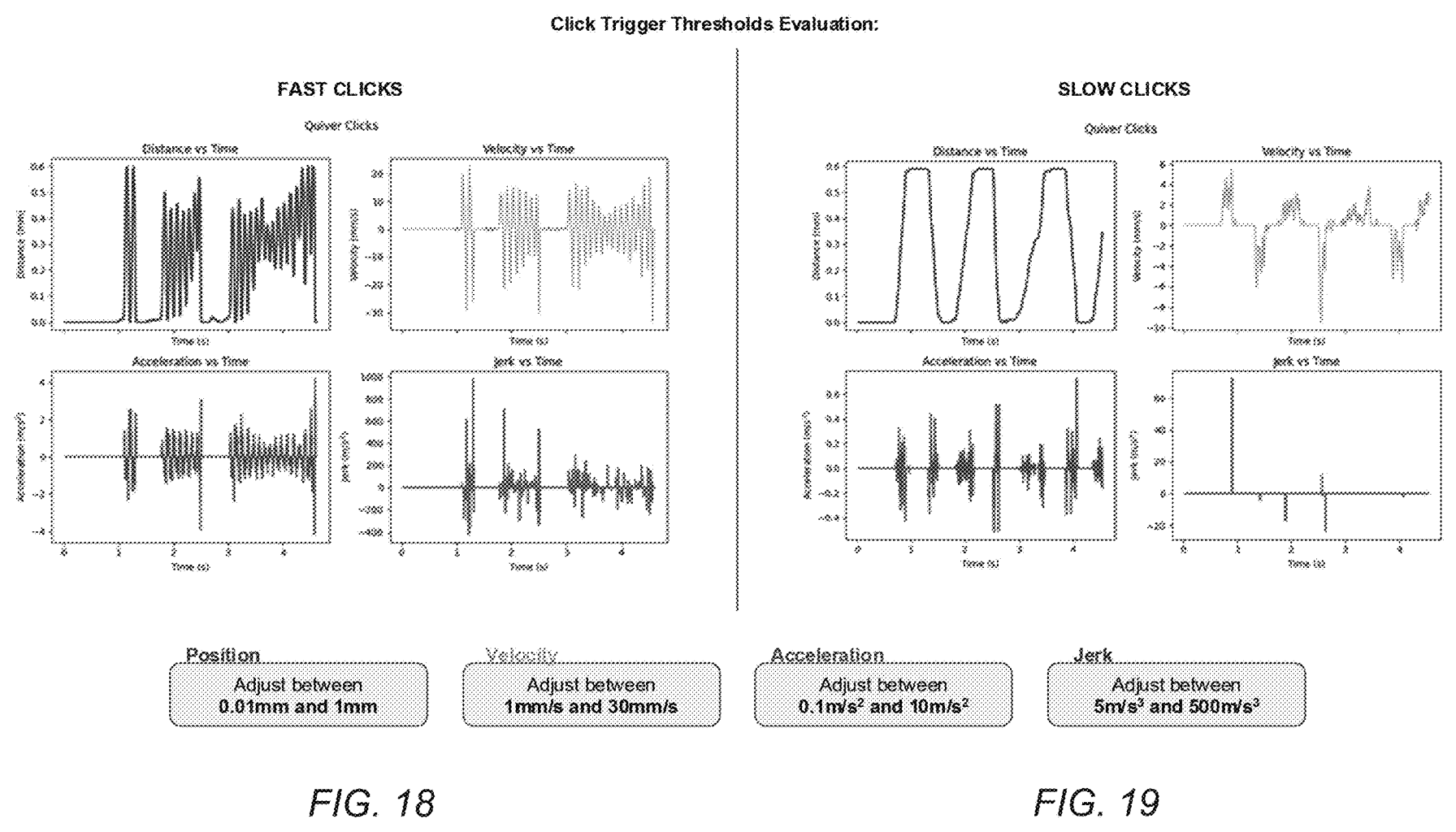

FIG. 18 shows key press trigger thresholds for fast clicks, according to certain embodiments, and includes sample graphs showing distance vs. time, velocity vs. time, acceleration vs. time, and jerk vs. time. FIG. 19 shows key press trigger thresholds for slow clicks, according to certain embodiments, and includes sample graphs showing distance vs. time, velocity vs. time, acceleration vs. time, and jerk vs. time. In some aspects, a position trigger threshold can be between 0.01 mm and 1 mm, a velocity trigger threshold can be between 1 mm/s to 30 mm/s, an acceleration trigger threshold can be between 0.1 $m/s^2$ and 10 $m/s^2$, and a jerk trigger threshold can be between 5 $m/s^3$ and 500 $m/s^3$. One of ordinary skill in the art with the benefit of this disclosure would appreciate the many modifications, variations, and alternative embodiments thereof.

Figure 20:
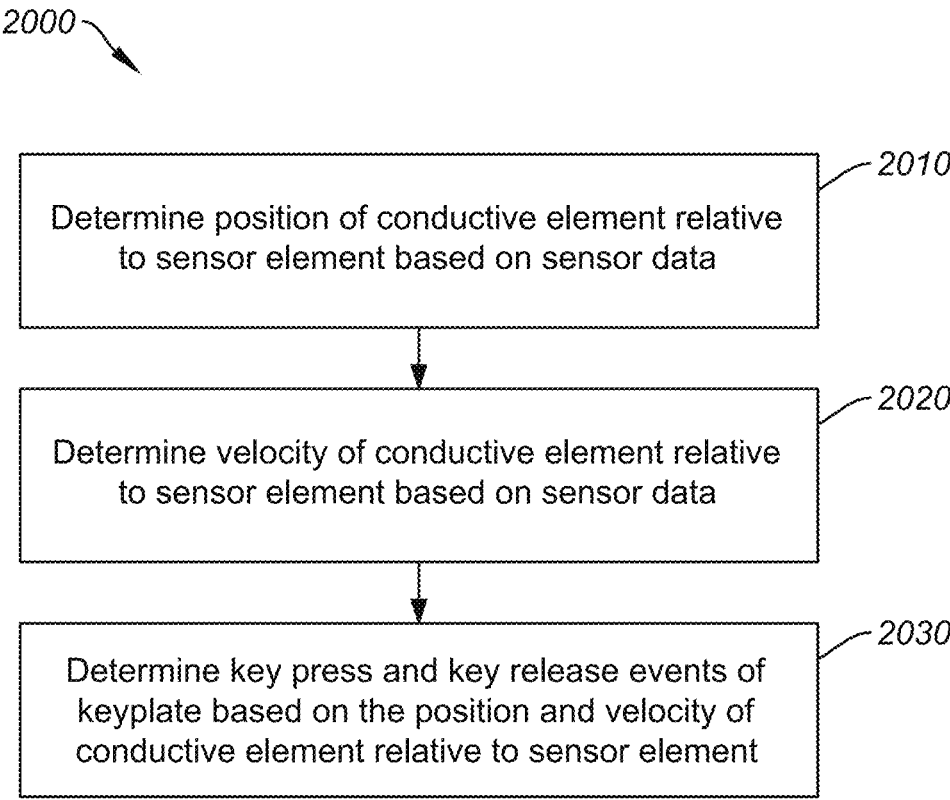
FIG. 20 is a simplified flow chart showing aspects of a method for implementing fast activation detection in a computer peripheral device, according to certain embodiments.

FIG. 20 is a simplified flow chart showing aspects of a method 2000 for implementing fast activation detection in a computer peripheral device, according to certain embodiments. Method 2000 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 2000 (as well as the other embodiments described herein) can be performed by aspects of system 200 (e.g., processor 210), system 300 (e.g., processor 302), or a combination thereof.

At operation 2010, method 2000 can include determining a position of a conductive element relative to a sensor element based on position data, according to certain embodiments.

At operation 2020, method 2000 can include determining a velocity of a conductive element relative to a sensor element based on velocity data, according to certain embodiments.

At operation 2030, method 2000 can include determining key press and key release events of a keyplate based on the position and velocity of the conductive element relative to the sensor element, to certain embodiments.

It should be appreciated that the specific steps illustrated in FIG. 20 provide a particular method 2000 for implementing fast activation detection in a computer peripheral device, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

In some embodiments of switchless computer mice (or other related computer peripheral devices), position detection can be generally reliable, but high performance functions, such as fast activation, which may be commonplace in e-sports and gaming scenarios, may cause false positive button press detection when overly sensitive, or may not be sensitive enough to detect intended press and/or release events. A more reliable and robust detection scheme can be realized by using other detection metrics, including velocity, acceleration, and/or jerk, as a way to better interpret a user's intended action. In such embodiments, a switchless computer mouse can include a keyplate, a conductive element coupled to the keyplate, a sensor element configured to detect a magnetic field of the conductive element and generate sensor data corresponding to the detected magnetic field, and one or more processors configured to: determine a position of the conductive element relative to the sensor element based on the sensor data; determine a velocity (e.g., and/or acceleration and jerk) of the conductive element relative to the sensor element based on the sensor data; and determine key press and key release events of the keyplate based on the position and velocity (and acceleration and/or jerk in some embodiment) of the conductive element relative to the sensor element.

In some embodiments presented herein, a position trigger threshold can be modified to change a resolution of the determining of the position of the target based on a movement sensor that tracks a movement of the computer mouse, an accelerometer of the computer mouse, or any other sensor on the mouse. For example, position sensing may switch from one step to three steps when the mouse is determined to be picked up (e.g., skating) or move at a relatively high acceleration, which may more likely correspond to a user setting the mouse at a new location (e.g., after skating) rather than articulating the mouse for a functional purpose.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C#or C++, or any scripting language, such as Perl, Python or TCL, as well as combinations thereof. The server(s) may also include database servers, including without limitation those commercially available from Oracle®, Microsoft®, Sybase© and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer mouse comprising:
a keyplate operable to be depressed over a range of motion;
a target coupled to the keyplate;
a sensor configured separate from the target;
a haptic element; and
one or more processors operable to:
control the sensor to detect a movement of the target over the keyplate range of motion; and
control the haptic element to generate a haptic feedback when the sensor detects that the movement of the target corresponds to a threshold value,
wherein the sensor generates sensor data corresponding to an acceleration of the target relative to the sensor.

2. The computer mouse of claim 1 wherein the haptic element generates the haptic feedback and couples the haptic feedback to a user accessible portion of the computer mouse.

3. The computer mouse of claim 2 wherein the user accessible portion is the keyplate.

4. The computer mouse of claim 1 wherein the haptic element is a linear resonance actuator.

5. The computer mouse of claim 1 wherein the sensor is one of an inductive sensor, an optical sensor, a capacitive sensor, or a magnetic sensor.

6. The computer mouse of claim 1 wherein the target is an electrically conductive element.

7. A computer mouse comprising:
A keyplate operable to be depressed over a range of motion;

a target coupled to the keyplate;

a first sensor configured separate from the target;

a second sensor coupled to the target; and one or more processors operable to:

control the first sensor to detect a first type of movement of the target over the keyplate range of motion; and control the second sensor to detect a second type of movement of the target over the keyplate range of motion.

8. The computer mouse of claim 7 wherein the first sensor is configured to detect a position of the target relative to the first sensor.

9. The computer mouse of claim 8 wherein the second sensor is configured to detect an acceleration of the target.

10. The computer mouse of claim 9 further comprising a haptic element, wherein the one or more processors are further operable to control the haptic element to generate a haptic feedback when:

the first sensor detects that the position of the target has moved by at least a first threshold value; and the second sensor detects that an acceleration of the target is at least a second threshold value.

* * * * *